(12) United States Patent
Gilliam et al.

(10) Patent No.: US 7,875,163 B2
(45) Date of Patent: Jan. 25, 2011

(54) LOW ENERGY 4-CELL ELECTROCHEMICAL SYSTEM WITH CARBON DIOXIDE GAS

(75) Inventors: Ryan J. Gilliam, San Jose, CA (US); Thomas A. Albrecht, Mountain View, CA (US); Nikhil Jalani, Campbell, CA (US); Nigel Antony Knott, Campbell, CA (US); Valentin Decker, San Jose, CA (US); Michael Kostowskyj, Los Gatos, CA (US); Bryan Boggs, Campbell, CA (US); Kasra Farsad, San Jose, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

(21) Appl. No.: 12/521,256

(22) PCT Filed: Jun. 24, 2009

(86) PCT No.: PCT/US2009/048511
§ 371 (c)(1),
(2), (4) Date: Mar. 5, 2010

(87) PCT Pub. No.: WO2010/008896
PCT Pub. Date: Jan. 21, 2010

(65) Prior Publication Data
US 2010/0116683 A1 May 13, 2010

Related U.S. Application Data

(60) Provisional application No. 61/081,299, filed on Jul. 16, 2008, provisional application No. 61/091,729, filed on Aug. 25, 2008.

(51) Int. Cl.
*C25B 1/00* (2006.01)

(52) U.S. Cl. ............... 205/510; 205/514; 205/517; 204/252; 204/263

(58) Field of Classification Search ............... 205/510, 205/514, 517; 204/252, 263
See application file for complete search history.

(56) References Cited

U.S. PATENT DOCUMENTS

| | | | |
|---|---|---|---|
| 1,678,345 A | 7/1928 | Mattison |
| 1,865,833 A | 7/1932 | Chesny |

(Continued)

FOREIGN PATENT DOCUMENTS

AU 2007100157 4/2007

(Continued)

OTHER PUBLICATIONS

Allen, L.M. 1992. Boron and Sulfur Isotopic Fractionation in the Coal Combustion System. A Thesis Submitted to the Faculty of the Department of Hydrology and Water Resources. The University of Arizona.

(Continued)

*Primary Examiner*—Arun S Phasge

(57) ABSTRACT

A low-voltage, low-energy electrochemical system and method of producing hydroxide ions and/or bicarbonate ions and/or carbonate ions utilizing significantly less than the typical 3V used across the conventional anode and cathode to produce the ions; consequently, carbon dioxide emissions attributable to the present system and method are significantly reduced.

14 Claims, 5 Drawing Sheets

U.S. PATENT DOCUMENTS

| | | |
|---|---|---|
| 1,897,725 A | 2/1933 | Gaus et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,934,419 A | 4/1960 | Cook |
| 2,967,807 A | 1/1961 | Osborne et al. |
| 3,046,152 A | 7/1962 | Tsuneyoshi |
| 3,120,426 A | 2/1964 | Crawford, Jr. |
| 3,165,460 A * | 1/1965 | Zang et al. .................. 204/634 |
| 3,179,579 A | 4/1965 | Gustave et al. |
| 3,196,092 A | 7/1965 | Beer |
| 3,202,522 A | 8/1965 | Chi-Sun Yang et al. |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,686,372 A | 8/1972 | Hiatt et al. |
| 3,725,267 A | 4/1973 | Gelblum |
| 3,861,928 A | 1/1975 | Slater et al. |
| 3,864,236 A | 2/1975 | Lindstrom |
| 3,904,496 A | 9/1975 | Harke et al. |
| 3,917,795 A | 11/1975 | Pelczarski et al. |
| 3,925,534 A | 12/1975 | Singleton et al. |
| 3,953,568 A | 4/1976 | Seko et al. |
| 3,963,592 A | 6/1976 | Lindstrom |
| 3,970,528 A | 7/1976 | Zirngiebl et al. |
| 4,026,716 A | 5/1977 | Urschel III, et al. |
| 4,036,749 A | 7/1977 | Anderson |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,128,462 A | 12/1978 | Ghiringhelli et al. |
| 4,140,510 A | 2/1979 | Scholze et al. |
| 4,147,599 A | 4/1979 | O'Leary et al. |
| 4,164,537 A | 8/1979 | Drostholm et al. |
| 4,188,291 A | 2/1980 | Anderson |
| 4,217,186 A | 8/1980 | McRae |
| 4,242,185 A | 12/1980 | McRae |
| 4,246,075 A | 1/1981 | Hilbertz |
| 4,253,922 A | 3/1981 | Welch |
| 4,264,367 A | 4/1981 | Schutz |
| 4,308,298 A | 12/1981 | Chen |
| 4,335,788 A | 6/1982 | Murphey et al. |
| 4,361,475 A | 11/1982 | Moeglich |
| 4,370,307 A | 1/1983 | Judd |
| 4,376,101 A | 3/1983 | Sartori et al. |
| 4,410,606 A | 10/1983 | Loutfy et al. |
| 4,450,009 A | 5/1984 | Childs et al. |
| 4,477,573 A | 10/1984 | Taufen |
| 4,561,945 A | 12/1985 | Coker et al. |
| 4,588,443 A | 5/1986 | Bache |
| 4,620,969 A | 11/1986 | Wilkinson |
| 4,716,027 A | 12/1987 | Morrison |
| 4,804,449 A | 2/1989 | Sweeney |
| 4,818,367 A | 4/1989 | Winkler |
| 4,838,941 A | 6/1989 | Hill |
| 4,899,544 A | 2/1990 | Boyd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,230,734 A | 7/1993 | Kumasaka et al. |
| 5,244,304 A | 9/1993 | Weill et al. |
| 5,246,551 A | 9/1993 | Pletcher et al. |
| 5,282,935 A | 2/1994 | Cawlfield et al. |
| 5,362,688 A | 11/1994 | Porta et al. |
| 5,364,611 A | 11/1994 | Iijima et al. |
| 5,366,513 A | 11/1994 | Goldmann et al. |
| 5,388,456 A | 2/1995 | Kettel |
| 5,470,671 A | 11/1995 | Fletcher et al. |
| 5,520,898 A | 5/1996 | Pinnavaia et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,624,493 A | 4/1997 | Wagh et al. |
| 5,690,729 A | 11/1997 | Jones, Jr. |
| 5,702,585 A | 12/1997 | Hillrichs et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,803,894 A | 9/1998 | Kao et al. |
| 5,846,669 A | 12/1998 | Smotkin et al. |
| 5,849,075 A | 12/1998 | Hopkins et al. |
| 5,855,666 A | 1/1999 | Kao et al. |
| 5,855,759 A | 1/1999 | Keating et al. |
| 5,885,478 A | 3/1999 | Montgomery et al. |
| 5,897,704 A | 4/1999 | Baglin |
| 5,925,255 A | 7/1999 | Mukhopadhyay |
| 5,965,201 A | 10/1999 | Jones, Jr. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,090,197 A | 7/2000 | Vivian et al. |
| 6,129,832 A | 10/2000 | Fuhr et al. |
| 6,180,012 B1 | 1/2001 | Rongved |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,235,186 B1 | 5/2001 | Tanaka et al. |
| 6,248,166 B1 | 6/2001 | Solsvik |
| 6,251,356 B1 | 6/2001 | Mathur |
| 6,264,740 B1 | 7/2001 | McNulty, Jr. |
| 6,293,731 B1 | 9/2001 | Studer |
| 6,352,576 B1 | 3/2002 | Spencer et al. |
| 6,375,825 B1 | 4/2002 | Mauldin et al. |
| 6,387,212 B1 | 5/2002 | Christian |
| 6,402,831 B1 | 6/2002 | Sawara et al. |
| 6,416,574 B1 | 7/2002 | Steelhammer et al. |
| 6,444,107 B2 | 9/2002 | Hartel et al. |
| 6,475,460 B1 | 11/2002 | Max |
| 6,495,013 B2 | 12/2002 | Mazur et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,602,630 B1 | 8/2003 | Gopal |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,890,419 B2 | 5/2005 | Reichman et al. |

| Patent/Publication | Date | Inventor |
|---|---|---|
| 6,890,497 B2 | 5/2005 | Rau et al. |
| 6,908,507 B2 | 6/2005 | Lalande et al. |
| 6,936,573 B2 | 8/2005 | Wertz et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,198,722 B2 | 4/2007 | Hussain |
| 7,255,842 B1 | 8/2007 | Yeh et al. |
| 7,261,912 B2 | 8/2007 | Zeigler |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,595,001 B2 | 9/2009 | Arakel et al. |
| 7,674,443 B1 | 3/2010 | Davis |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0188668 A1 | 10/2003 | Bland |
| 2003/0213937 A1 | 11/2003 | Yaniv |
| 2003/0229572 A1 | 12/2003 | Raines et al. |
| 2004/0014845 A1 | 1/2004 | Takamura et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0255174 A1 | 11/2005 | Shelley et al. |
| 2006/0048517 A1 | 3/2006 | Fradette et al. |
| 2006/0051274 A1 | 3/2006 | Wright et al. |
| 2006/0057036 A1 | 3/2006 | Hermosillo |
| 2006/0060532 A1 | 3/2006 | Davis |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1* | 8/2006 | Jones ........................ 205/508 |
| 2006/0195002 A1 | 8/2006 | Grandjean et al. |
| 2006/0196836 A1 | 9/2006 | Arakel et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0240570 A1 | 10/2007 | Jadhav et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0059206 A1 | 3/2008 | Jenkins |
| 2008/0112868 A1 | 5/2008 | Blencoe et al. |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0223727 A1 | 9/2008 | Oloman et al. |
| 2008/0236143 A1 | 10/2008 | Lo |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0081093 A1 | 3/2009 | Comrie |
| 2009/0081096 A1 | 3/2009 | Pellegrin |
| 2009/0090277 A1 | 4/2009 | Joshi et al. |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0024686 A1 | 2/2010 | Constantz et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0132556 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |

| | | | |
|---|---|---|---|
| 2010/0155258 A1 | 6/2010 | Kirk et al. | |

FOREIGN PATENT DOCUMENTS

| | | |
|---|---|---|
| AU | 2008256636 B2 | 12/2008 |
| CA | 1335974 A1 | 6/1995 |
| CA | 2646462 | 9/2007 |
| DE | 2653649 A1 | 6/1978 |
| DE | 3146326 A1 | 6/1983 |
| DE | 3638317 A1 | 1/1986 |
| DE | 19523324 A1 | 9/1994 |
| DE | 19512163 A1 | 10/1995 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 BI | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| GB | 911386 A | 11/1962 |
| GB | 1392907 | 5/1975 |
| GB | 2032441 | 5/1980 |
| GB | 2210035 A | 6/1989 |
| GB | 2371810 | 8/2002 |
| JP | 51102357 A1 | 9/1976 |
| JP | 59100280 | 12/1982 |
| JP | 1142093 | 11/1987 |
| JP | 63-312988 A2 | 12/1988 |
| JP | 03-020491 A2 | 1/1991 |
| JP | 03-170363 A | 7/1991 |
| JP | 7061842 A | 3/1995 |
| JP | 10305212 A | 11/1998 |
| JP | 2003041388 | 7/2001 |
| JP | 2002-273163 A | 9/2002 |
| JP | 2004-174370 | 6/2004 |
| JP | 2005-052762 | 3/2005 |
| JP | 2006-076825 | 3/2006 |
| NL | 7607470 A | 1/1978 |
| WO | WO 93/16216 A1 | 8/1993 |
| WO | WO 94/18119 | 8/1994 |
| WO | WO 96/34997 A1 | 11/1996 |
| WO | WO 99/13967 A1 | 3/1999 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/009600 A2 | 1/2006 |
| WO | WO 2006/034339 A1 | 3/2006 |
| WO | WO 2006/036396 A2 | 4/2006 |
| WO | WO 2006/099599 A2 | 9/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2010/006242 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/087823 A1 | 8/2010 |

OTHER PUBLICATIONS

Avery, G.B. et al. 2006. Carbon isotopic characterization of dissolved organic carbon in rainwater: Terrestrial and marine influences. *Science Direct*. 40(39): 7539-7545. Retrieved from the internet on May 20, 2010.

Baer, D.S., et al. 2002. Sensitive absorption measurements in the near-infrared region using off-axis integrated-cavity-output spectroscopy. *Appl. Phys. B.* 5 pages.

Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.

Biennier, L., et al. 2004. Multiplex integrated cavity output spectroscopy of cold PAH cations. *Chemical Physics Letters*. 387: 287-294.

Bottomley, D.J. et al. 1999. The origin and evolution of Canadian Shield brines: evaporation or freezing of seawater? New lithium isotope and geochemical evidence from the Slave craton. *Chemical Geology*. 155: 295-320.

Carbon Sequestration. National Energy Technology Laboratory, Jul. 1, 2008 (online) [retrieved on Dec. 21, 2009] <URL: http://web.archive.org/web/20080701213124/http://www.net1.doe.gov/technologies/carbon_seq/index.html>.

Cerling, T.E. 1984. The stable isotopic composition of modern soil carbonate and its relationship to climate. *Earth and Planetary Science Letters*. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

Criss, R.E. 1995. Stable Isotope Distribution: Variations from Temperature, Organic and Water-Rock Interactions. Washington University, St. Louis, Department of Earch and Planetary Sciences. *American Geophysical Union*. pp. 292-307.

Dickens, A. et al. 2004. Reburial of fossil organic carbon in marine sediments. *Nature*. 427: 336-339. Retrieved from the internet on May 20, 2010.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

Elswick, E.R., et al. 2007. Sulfur and carbon isotope geochemistry of coal and derived coal-combustion by-products: An example from an Eastern Kentucky mine and power plant. *Applied Geochemistry*. 22: 2065-2077.

Fallick, A.E., et al. 1991. A Stable Isotope Study of the Magnesite Deposits Associated with the Alpine-Type Ultramafic Rocks of Yugoslavia. *Economic Geology*. 86: 847-861.

Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research*. 70(3): 565-585.

Holdgate, G.R., et al. 2009. Eocene-Miocene carbon-isotope and floral record from brown coal seams in the Gippsland Basin of southeast Australia. *Global and Planetary Change*. 65: 89-103.

Horkel, K., et al. 2009. Stable isotopic composition of cryptocrystalline magnesite from deposits in Turkey and Austria. *Geophysical Research Abstracts*. 11. (abstract only).

Horner, G. et al. 2004. Isotope selective analysis of CO2 with tunable diode laser (TDL) spectroscopy in the NIR. *The Analyst*. 129: 772-778.

Huijgen, W.J.J., et al. 2005. Mineral CO2 Sequestration by Steel Slag Carbonation. *Environ. Sci. Technol*. 39: 9676-9682.

Huijgen, W.J.J., et al. 2006. Energy Consumption and Net CO2 Sequestration of Aqueous Mineral Carbonation. *Ind. Eng. Chem. Res*. 45: 9184-9194.

Huntzinger, D.N. et al. 2009. A life-cycle assessment of Portland cement manufacturing: comparing the traditional process with alternative technologies. *Journal of Cleaner Production*. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edui/~dnhuntzi/DNHuntzingerETD.pdf>.

International Search Report dated Mar. 3, 2010 of EP08867440.3.
International Search Report dated May 6, 2010 of EP09716193.9.
International Search Report dated Jun. 22, 2010 of EP08772151.0.
International Search Report dated Jan. 4, 2010 of PCT/US09/062795.
International Search Report dated Jan. 13, 2010 of PCT/US09/059135.
International Search Report dated Feb. 2, 2010 of PCT/US09/059141.
International Search Report dated Feb. 24, 2010 of PCT/US09/067764.
International Search Report dated Mar. 10, 2010 of PCT/US10/022935.
International Search Report dated May 21, 2010 of PCT/US09/064117.

"Isotopic Signature", WIKIPEDIA (2010), http://en.wikipedia.org/wiki/Isotopic_signature, Apr. 14, 2009, 3 pp.

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

McCrea, J.M. 1950. On the Isotopic Chemistry of Carbonates and a Paleotemperature Scale. *The Journal of Chemical Physics*. 18(6): 849-857.

Melezhik, V.A., et al. 2001. Palaeproterozoic magnesite: lithological and isotopic evidence for playa/sabkha environments. *Sedimentology*. 48: 379-397.

Mihalcea, R.M., et al. 1998. Diode-laser absorption measurements of CO2 near 2.0 μm at elevated temperatures. *Applied Optics*. 37(36): 8341-8347.

Miljevic, N., et al. 2007. Potential Use of Environmental Isotopes in Pollutant Migration Studies. *Environmental Isotopes in Pollutant Studies*. 58: 251-262.

Mook, W.G., et al. 1968. Isotopic Equilibrium between Shells and Their Environment. *Science*. 159(3817): 874-875.

Mook, W.G., et al. 1974. Carbon Isotope Fractionation Between Dissolved Bicarbonate and Gaseous Carbon Dioxide. 22:169-176.

Mottana, A. et al. 1979. Der grosse Mineralienfuhrer, BLV Verlagsgesel lschaft mbH, Munchen, XP002577921, p. 194. (In German with English Translation).

Noda, H., et al. 1990. Electrochemical Reduction of Carbon Dioxide at Various Metal Electrodes in Aqueous Potassium Hydrogen Carbonate Solution. *The Chemical Society of Japan*. 63: 2459-2462.

O'Neil, J.R., et al. 1971. C13 and O18 compositions in some freshwater carbonates associated with ultramafic rocks and serpentines: western United States*. *Geochimica et Cosmochimica Acta*. 35: 687-697.

Philp, R.P. 2007. The emergence of stable isotopes in environmental and forensic geochemistry studies: a review. *Environ Chem Lett*. 5:57-66.

Portier et al. 2005. Modelling CO2 solubility in pure water and NaCl-type waters from 0 to 300° C. and from 1 to 300 bar Application to the Utsira Formation at Sleipner. *Chemical Geology*. 217: 187-199.

Power, I.M., et al. 2007. Biologically induced mineralization of dypingite by cyanobacteria from an alkaline wetland near Atlin, British Columbia, Canada. *Geochemical Transactions*. 8: 16 pages.

Quay, P.D., et al. 1992. Oceanic Uptake of Fossil Fuel Co$_2$$: Carbon- 13 Evidence. *Science*. 256 (5053): 74-79.

Saad, N. et al. 2009. Measurement of Isotopic CO2 in Dissolved Inorganic Carbons of Water Samples from Various Origins Using Wavelength-Scanned Cavity Ring-Down Spectrophotometer. *Geophysical Research Abstracts*. 11. (abstract only).

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010, ] <URL: http://www.agu.org/pubs/crossref/2008/2007JC004217.shtml>.

Schwab, E. 2004. Calciumhydroxid, XP-002577920. Retrieved from the Internet: <URL:http://www.roempp.com/prod/index1.html> (In German with English Translation).

Schouten, S., et al. 2004. Stable Carbon Isotopic Fractionations Associated with Inorganic Carbon Fixation by Anaerobic Ammonium-Oxidizing Bacteria. *Applied and Environmental Microbiology*. 70(6): 3785-3788.

Schroll, E. 2002. Genesis of magnesite deposits in the view of isotope geochemistry. *Boletim Paranaense de Geociencias*. 50: 59-68.

Sheppard, S.M.F., et al. 1970. Fractionation of Carbon and Oxygen Isotopes and Magnesium between Coexisting Metamorphic Calcite and Dolomite. *Contr. Mineral. And Petrol*. 26. 161-198.

Sethi, S. et al. 2006. Existing & Emerging Concentrate Minimization & Disposal Practices for Membrane Systems. *Florida Water Resources Journal*. pp. 38, 40, 42, 44, 46, 48..

Sial, A.N., et al. 2000. Carbon isotope fluctuations in Precambrian carbonate sequences of several localities in Brazil. *An. Acad. Bras. Ci*. 72(4): 539-558.

Stanley, S.M., et al. 2002. Low-magnesium calcite produced by coralline algae in seawater of Late Cretaceous composition. *PNAS*. 99(24): 15323-15326.

U.S. Appl. No. 12/126,776, filed May 23, 2008, Constantz, Brent R., et al, Non-Final Office Action dated Feb. 25, 2010; 21 pp.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/163,205, filed Jun. 27, 2008, Constantz, Brent R., et al, Non-Final Office Action dated Mar. 25, 2010.

U.S. Appl. No. 12/344,019, filed Dec. 24, 2008, Constantz, Brent R., et al, Non-Final Office Action dated Nov. 16, 2009.
U.S. Appl. No. 12/344,019, filed Dec. 24, 2008, Constantz, Brent R., et al, Non-Final Office Action dated Mar. 11, 2010.
U.S. Appl. No. 12/375,632, filed Mar. 5, 2009, Kirk, Donald W. et al, Non-Final Office Action dated Mar. 19, 2010.
U.S. Appl. No. 12/475,378, filed May 29, 2009, Constantz Brent. et al, Final Office Action dated May 5, 2010.
U.S. Appl. No. 12/475,378, filed May 29, 2009, Constantz Brent. et al, Non-Final Office Action dated Mar. 17, 2010.
U.S. Appl. No. 12/475,378 filed May 29, 2009, Constantz Brent. et al, Non-Final Office Action dated Mar. 2, 2010.
U.S. Appl. No. 12/486,692, filed Jun. 17, 2009, Constantz Brent. et al, Final Office Action dated May 3, 2010.
U.S. Appl. No. 12/486,692, filed Jun. 17, 2009, Constantz Brent. et al, Non-Final Office Action dated Mar. 23, 2010.
U.S. Appl. No. 12/486,692, filed Jun. 17, 2009, Constantz Brent. et al, Non-Final Office Action dated Mar. 1, 2010.
U.S. Appl. No. 12/501,217, filed Jul. 10, 2009, Constantz Brent. et al, Non-Final Office Action dated Mar. 12, 2010.
U.S. Appl. No. 12/557,492, filed Sep. 10, 2009, Constantz, Brent R., et al. Non-Final Office Action dated May 6, 2010.
U.S. Appl. No. 12/604,383, filed Oct. 22, 2009, Constantz Brent R. et al, Non-Final Office Action dated Apr. 5, 2010.
U.S. Appl. No. 12/604,383, filed Oct. 22, 2009, Constantz Brent R. et al, Final Office Action dated Jun. 11, 2010.
U.S. Appl. No. 12/571,398, filed Sep. 30, 2009, Constantz Brent R. et al, Non-Final Office Action dated May 3, 2010.
U.S. Appl. No. 12/609,491, filed Oct. 30, 2009, Constantz Brent. et al, Non-Final Office Action dated Mar. 31, 2010.
Vagin, S.P., et al. 1979. Measurement of the Temperature of Gas Media Containing Carbon Dioxide by the Laser-Probing Method. *Plenum*.
Wang, W., et al. 2005. Effects of biodegradation on the carbon isotopic composition of natural gas—A case study in the bamianhe oil field of the Jiyang Depression, Eastern China. *Geochemical Journal*. 39(4): 301-309. (abstract) [online] [retrieved on Dec. 29, 2009] <URL: http://www/jstage.jst.go.jp/article/geochemj/39/4/39_301/_article> ab.
Webber, M.E., et al. 2001. In situ combustion measurements of $CO_2$ by use of a distributed-feedback diode-laser sensor near 2.0 µm. *Applied Optics*. 40(6): 821-828.
Wen-Zhi et al., "Using Electrolytic Method to Promote $CO_2$ Sequestration in Serpentine by Mineral Carbonation"; Journal of China University of Mining and Technology; vol. 36, No. 6; Nov. (2007) (Publication and English Translation).
Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc*. 104: 95-112.
Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_Toronto_06-88_0114.PDF>.
Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.
Aker, "Aker Clean Carbon, Carbon Capture Solutions Provider" Aker Clean Carbon Presentation for UN's IPCC; Jan. 24 (2008); 8pp.
Alexander, G. et al., "Evaluation of reaction variables in the dissolution of serpentine for mineral carbonation"; Elsevier; ScienceDirect Fuel 86 (2007) 273-281.
Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.
Bond, G.M., et al. 2001. $CO_2$ Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.
Bond, G.M., et al. 2002. Brines as possible cation sources for biomimetic carbon dioxide sequestration. *American Geophysical Union* Abstract #U22A-07.
CICCS "Aims and Research"; www.nottingharn.ac.uk/carbonmanagement/ccs_aims.php 2pp Aug. 3 (2007).
Druckenmiller et al., "Carbon sequestration using brine of adjusted pH to form mineral carbonates"; Elsevier; www.elsevier.com/locate/fuproc; Fuel Processing Technology 86 (2005) 1599-1614.
Faverjon, F. et al. 2005. Electrochemical study of a hydrogen diffusion anode-membrane assembly for membrane electrolysis. *Electrochimica Acta* 51 (3): 386-394.
Faverjon, F. et al. 2006. Regeneration of hydrochloric acid and sodium hydroxide from purified sodium chloride by membrane electrolysis using a hydrogen diffusion anode-membrane assembly. *Journal of Membrane Science* 284 (1-2): 323-330.
Gain, E. et al. 2002. Ammonium nitrate wastewater treatment by coupled membrane electrolysis and electrodialysis. *Journal of Applied Electrochemistry* 32: 969-975.
Genders, D. 1995. Electrochemical Salt Splitting. http://www.electrosynthesis.com/news/mwatts.html (accessed Feb. 5, 2009).
Goldberg et al., "$CO_2$ Mineral Sequestration Studies in US"; National Energy Technology Laboratory; goldberg@netl.doe.gov; 10pp.
Graff "Just Catch—$CO_2$ Capture Technology" Aker Kvaerner; Pareto Clean Energy Tech Seminar Oct. 11, 2007 25pp.
Green Car Congress "PKU Researchers Carry Out Aqueous Fischer-Tropsch Reaction for First Time"; www.greeencarcongress.com/2007/12/pku-researchers.html; Dec. 12, 2007; 2pp.
Green Car Congress "Researcher Proposes System for Capture of Mobile Source $CO_2$ Emissions Directly from Atmosphere"; www.greeencarcongress.com/2007/10/researcher-prop.html#more; Oct. 8, 2007; 4pp.
Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.
Haywood et al., "Carbon dioxide sequestration as stable carbonate minerals—environmental barriers"; Environmental Geology (2001) 41:11-16; Springer-Verlag 2001.
Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp.
Holze, S. et al. 1994. Hydrogen Consuming Anodes for Energy Saving in Sodium Sulphate Electrolysis. *Chem. Eng. Technol*. 17: 382-389.
Huijgen, W.J.J., et al. 2003. Carbon dioxide sequestration by mineral carbonation. ECN-C-03-016; Energy Research Centre of the Netherlands: Petten; pp. 1-42.
International Search Report dated Feb. 19, 2009 of PCT/US08/88242.
Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.
Lackner, K. "Carbonate Chemistry for Sequestering Fossil Carbon"; Annual Review Energy Environ. 2002 27:193-232.
Mazrou, S., et al. 1997. Sodium hydroxide and hydrochloric acid generation from sodium chloride and rock salt by electro-electrodialysis. *Journal of Applied Electrochemistry* 27: 558-567.
Nayak, V.S. "Nonelectrolytic Production of Caustic Soda and Hydrochloric Acid from Sodium Chloride"; Ind. Eng. Chem. Res. 1996. 35: 3808-3811.
O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May (2001) 12pp.
Park, A., et al. 2004. $CO_2$ mineral sequestration: physically activated dissolution of serpentine and pH swing process. *Chemical Engineering Science* 59 (22-23): 5241-5247.

Rau, G. 2004. Possible use of Fe/CO2 fuel cells for CO2 mitigation plus H2 and electricity production. *Energy Conversion and Management*. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.htmlref=todayspaper; 4pp.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions, "ADIP-X and Sulfinol-X—new regenerable acid-gas removal processes"; Shell Global Solutions International; OG 130210370903-En(A); www.shellglobalsoultions.com 2 pp.

Tececo Pty Ltd, "Eco-Cement"; www.tececo.com/simple.eco-cement.php; Dec. 29, 2008; 6pp.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

Cannell, M.G.R. 2003. "Carbon sequestration and biomass energy offset: theoretical, potential and achievable capacities globally, in Europe and the UK." Biomass and Bioenergy. 24: 97-116.

Levy, D. "Burnt biomass causes short-term global cooling, long-term warming." http://news-service.stanford.edu/news/2004/august4/biomass-84.html. 3 pages.

Turner, J.A. 1999. "A Realizable Renewable Energy Future." Science. 285 (5428): 687-689.

Wright, L.L., et al. 1993. "U.S. Carbon Offset Potential Using Biomass Energy Systems." Water, Air, and Soil Pollution. 70: 483-497.

Back, M. et al.,"Reactivity of Alkaline Lignite Fly Ashes Towards CO in Water." Environmental Science & Technology. vol. 42, No. 12 (2008) pp. 4520-4526.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

Justnes, H. et al. "Pozzolanic, Amorphous Silica Produced from the Mineral Olivine." Proceedings of the Seventh CANMET/ACI International Conference on Fly Ash, Silica Fume, Slag And Natural Pozzolans in Concrete, 2001. SP-199-44. pp. 769-781.

Lackner, K.S. et al. "Carbon Dioxide Disposal in Carbonate Minerals." Energy. 1995. 20(11): 1153-1170.

Montes-Hernandez, G. et al.,"Mineral sequestration of CO2 by aqueous carbonation of coal combustion fly-ash." Journal of Hazardous Materials vol. 161 (2009). pp. 1347-1354.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Sadhwani et al., "Case Studies on environmental impact of seawater desalination" Science Direct; http://www.sciencedirect.com/science?_ob=ArticleURL&_udi=B6TFX-4HMX97J-3&_u...3pp.

Uibu, M. et al., "CO2 mineral sequestration in oil-shale wastes from Estonian power production." Journal of Environmental Management vol. 90 (2009). pp. 1253-1260.

Uibu, M. et al., "Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al., "Utilization of Carbon Dioxide in Fly Ash and Water Mixtures." Chemical Engineering Research and Design. 2006. 84(A9): 843-846.

U.S. Appl. No. 12/375,632 filed Mar. 5, 2009, Kirk, Donald W. et al, Non-Final Office Action dated Sep. 8, 2009.

"Electrochemical cell", Wikipedia (2009), http:en.wikipedia.org/wiki/Electrochemical_Cell, Nov. 24, 2009, 5 pp.

International Search Report dated Dec. 14, 2009 of PCT/US09/061748.

* cited by examiner

LOW ENERGY 4-CELL ELECTROCHEMICAL SYSTEM WITH CARBON DIOXIDE GAS

CROSS-REFERENCE TO RELATED APPLICATIONS

Under 35 U.S.C. §119 (e), this application claims priority to commonly assigned U.S. Provisional Patent Application No. 61/081,299 filed Jul. 16, 2008, title: "Low Energy pH Modulation for Carbon Sequestration Using Hydrogen Absorptive Metal Catalysts"; and commonly assigned U.S. Provisional Patent Application No. 61/091,729 filed Aug. 25, 2008, title: "Low Energy Absorption of Hydrogen Ion from an Electrolyte Solution into a Solid Material", both of which are herein incorporated by reference in their entirety.

Under 35 U.S.C §119 (a) and under 35 U.S.C §365, this application is a continuation-in-part of and claims priority to commonly assigned PCT Patent Application no. PCT/US08/88242, titled "Low-energy Electrochemical Hydroxide System and Method" filed on Dec. 23, 2008, and is a continuation-in-part of and claims priority to commonly assigned PCT Patent Application no PCT/US09/32301 titled "Low-energy Electrochemical Bicarbonate Ion Solution" filed on Jan. 28, 2009, both of which are herein incorporated by reference in their entirety.

BACKGROUND

A solution of hydroxide ions, carbonate ions and/or bicarbonate ions is often required to remove protons from a solution, or buffer the pH of a solution, or precipitate an insoluble hydroxide and/or carbonate and/or bicarbonate from a solution. Conventionally, hydroxide ions can be produced by hydrolyzing a base, e.g., slaking quicklime; or, by electrolyzing a salt solution, e.g., electrolyzing an aqueous sodium chloride solution as in the Chlor-alkali process. Conventionally, carbonate ions or bicarbonate ions can be produced by dissolving carbon dioxide gas in water or by dissolving a soluble carbonate or bicarbonate salt, e.g., sodium bicarbonate, in water.

Although hydrolyzing a base or electrolyzing a salt solution can produce hydroxide ions, the conventional production of hydroxide ions consumes large amounts of energy; the conventional methods also release large amounts of carbon dioxide into the environment. Thus, for example, in producing quicklime, large amounts of fossil fuels are burned to calcine and convert limestone to calcium oxide, with the consequential release of large amounts of carbon dioxide into environment. Similarly, in producing hydroxide ions by the Chlor-alkali process, since typically at least 3V is required across the anode and cathode to drive the reaction, large amounts of energy are utilized. As this energy is derived typically from fossil fuelled power generating plants, this process also causes release of large amounts of carbon dioxide into the environment. Similarly, in producing carbonate ions and bicarbonate ions by dissolving carbon dioxide in aqueous solutions, a significant amount of energy is required to pressurize the gas for improved solubility, with the consequential release of large amounts of carbon dioxide into the environment attributable to the energy used. Thus, an energy efficient production of hydroxide ions, carbonate ions and bicarbonate ions is highly desirable.

SUMMARY

In various embodiments, the present system and method pertain to a low-voltage, low-energy electrochemical system and method of producing hydroxide ions and/or bicarbonate ions and/or carbonate ions. In various embodiments, the system and method utilize significantly less than the typical 3V used across the conventional anode and cathode to produce the ions; consequently, the carbon dioxide emissions attributable to the present system and method are significantly reduced.

In one embodiment, the system comprises: a first electrolyte in contact with a cathode; a second electrolyte in contact with an anode; a third electrolyte separated from the first electrolyte by a first ion-exchange membrane; a fourth electrolyte separated from the second electrolyte by a second ion-exchange membrane; and a third-ion exchange membrane separating the third and fourth electrolytes.

In one embodiment, the method comprises: placing a first electrolyte in contact with a cathode; placing a second electrolyte in contact with an anode; placing a third electrolyte such that it is separated from the first electrolyte by a first ion-exchange membrane; placing a fourth electrolyte such that it is separated from the third electrolyte by an third ion-exchange membrane and is separated from the second electrolyte by a second ion-exchange membrane; and forming hydroxide ions in the first electrolyte by applying a voltage across the anode and cathode.

In another embodiment, the method comprises: placing a first electrolyte in contact with a cathode; placing second electrolyte in contact with an anode; placing a third electrolyte such that it is separated from the first electrolyte by a first ion-exchange membrane; placing a fourth electrolyte such that it is separated from the third electrolyte by an third ion-exchange membrane and is separated from the second electrolyte by a second ion-exchange membrane; and supplying carbon dioxide gas to the first electrolyte.

In various embodiments, the first ion-exchange membrane comprises a cation exchange membrane; the second ion-exchange membrane comprises a cation exchange membrane; and the third ion-exchange membrane comprises an anion exchange membrane. In various embodiments, the first electrolyte is a cathode electrolyte in contact with the cathode, and the second electrolyte is an anode electrolyte in contact with an anode.

In various embodiments, the system and method are adapted to withdraw some or all of the cathode electrolyte via an outflow stream, and/or replenishing this electrolyte via an inflow stream to the cathode electrolyte compartment. In various embodiments, the system and method are adapted to withdraw some or all of the fourth electrolyte from an outflow stream and replenishing this electrolyte via an inflow stream of the fourth electrolyte compartment. In various embodiments, the system and method are adapted for batch, semi-batch or continuous flow operation, with or without withdrawing and replenishing the electrolytes in the system.

In various embodiments, the system includes a hydrogen gas transfer system adapted for directing hydrogen gas generated at the cathode to the anode. In another embodiment, the system includes a carbon dioxide delivery system adapted for delivering carbon dioxide gas into the cathode electrolyte where it dissolves and may form bicarbonate and/or carbonate ions, depending on the pH of the electrolyte. In embodiments in which carbon dioxide is supplied to the cathode electrolyte by dissolving the gas into the cathode electrolyte, the dissolution may in some embodiments occur in one or more compartments located in the outflow stream, or in an inflow stream or in between them. In various embodiments, the system is operably connected to an industrial waste gas stream comprising combustion gases for supplying gases, e.g., carbon dioxide, to the cathode electrolyte. In various embodiments, the waste gas stream includes combustion gases from fossil fuelled electrical power generating plants, cement manufacturing plants and/or other industrial plants. In various embodiments, the waste gas includes acidic gases, e.g., oxides of nitrogen (nitrous oxide, nitric oxide) and sulfur gases (sulfur dioxide, hydrogen sulfide) that dissolve in the cathode electrolyte to form anions. In some embodiments the waste gas is treated to remove some or all of its non-carbon dioxide components before contact with the cathode electrolyte.

In various embodiments, the products of the system and method including the hydroxide ions, bicarbonate ions, carbonate ions, hydrochloric acid and a partially desalinated water from which certain cation and anions have been removed are utilized to sequester carbon dioxide and other constituents of industrial waste gases, e.g., sulfur gases, nitrogen oxide gases and other combustion gases, by contacting the waste gas with a solution comprising divalent cations and the hydroxide, bicarbonate and/or carbonate ions to precipitate divalent cation carbonates and bicarbonates as described in commonly assigned U.S. patent application Ser. No. 12/344,019 filed on Dec. 24, 2008, herein incorporated by reference in its entirety. The precipitates, comprising, e.g., calcium and magnesium carbonates and bicarbonates in various embodiments are utilized as building materials, e.g., as cements and aggregates, as described in commonly assigned U.S. patent application Ser. No. 12/126,776 filed on May 23, 2008, herein incorporated by reference in its entirety.

In another application, the partially desalinated water from which cation and anions have been removed, e.g., a partially desalinated water formed by removing sodium and chloride ions from the third electrolyte, is used as feed water in a desalination system where the water is further processed as described in commonly assigned U.S. patent application Ser. No. 12/163,205 filed on Jun. 27, 2008, herein incorporated by reference in its entirety.

In another embodiment, the acid produced in the fourth electrolyte and/or the base solution produced in the cathode electrolyte are utilized to dissolve minerals and waste materials comprising divalent cations, e.g., $Ca^{++}$ and $Mg^{++}$ to produce divalent cation solutions that are utilized in producing divalent metal ion carbonate precipitates using the present cathode electrolyte. In various embodiments, the precipitates are used as building materials e.g. cement and aggregates as described in commonly assigned U.S. patent application Ser. No. 12/126,776, herein incorporated by reference in its entirety.

BRIEF DESCRIPTION OF THE DRAWINGS

The following drawings illustrate by way of examples and not by limitation embodiments of the present system and method.

DETAILED DESCRIPTION

Figure 1:
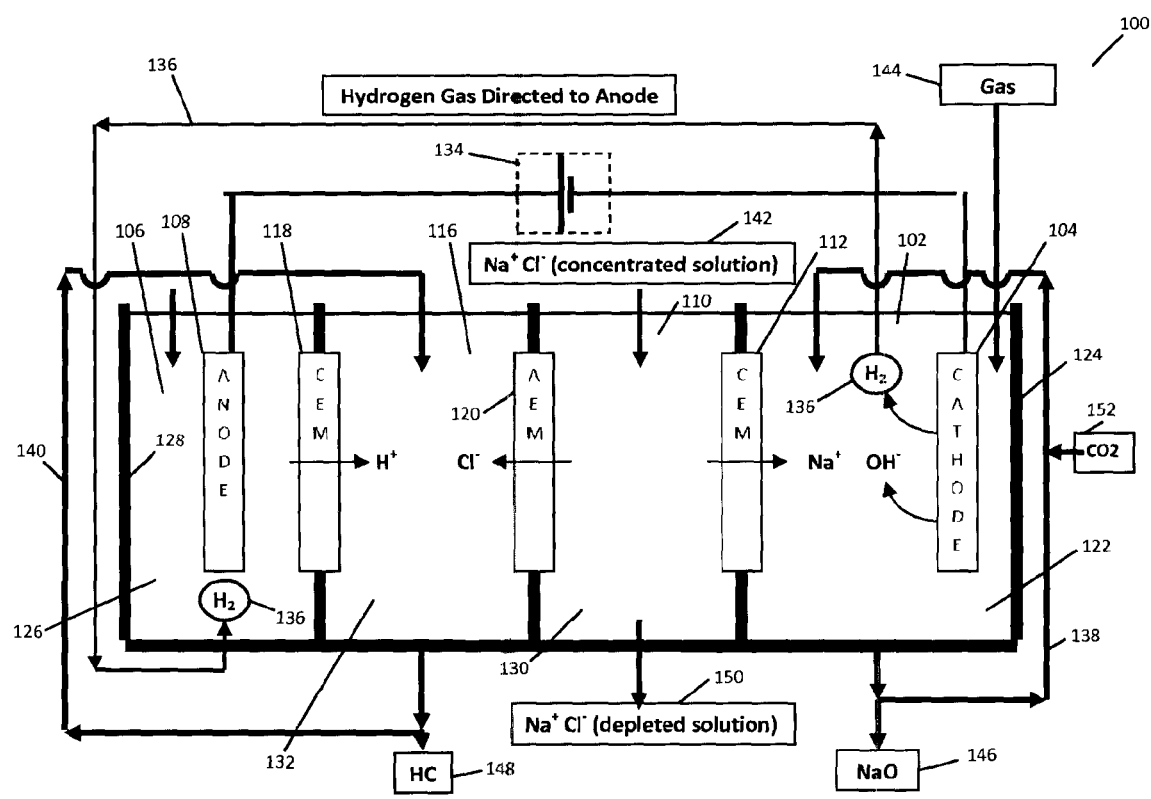
FIG. 1 is an illustration of an embodiment of the present system.

Before the present methods and systems are described in detail, it is should be understood that the present system and method are not limited to particular embodiments described and illustrated herein, as such may vary. It is also to be understood that the terminology used herein is for the purpose of describing particular embodiments only, and is not limiting, since the scope are limited only by the appended claims.

Herein, where a range of values is provided. it is should understood that each intervening value, to the tenth of the unit of the lower limit (unless the context clearly dictates otherwise) between the upper and lower limit of that range and any other stated or intervening value in that stated range, is encompassed within the present system and method. The upper and lower limits of these smaller ranges may independently be included in the smaller ranges and are also encompassed within the system and method, subject to any specifically excluded limit in the stated range. Where the stated range includes one or both of the limits, ranges excluding either or both of those included limits are also included in the system and method.

Herein, ranges are presented with numerical values being preceded by the term "about." Herein, the term "about" is used to provide literal support for the exact number that it precedes, as well as a number that is near to or approximately the number that the term precedes. In determining whether a number is near to or approximately a specifically recited number, the near or approximating un-recited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods, systems and materials similar or equivalent to those described herein can also be used in practicing the present system an method, only representative methods, systems and materials are herein described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may differ from the actual publication dates that may need to be independently confirmed.

As used herein and in the appended claims, the singular forms "a," "an," and "the" include plural references unless the context clearly dictates otherwise. Also, the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art, each of the embodiments described and illustrated herein comprise discrete components and features which may be readily separated from or combined with the features of any of the other several embodiments without departing from the scope of the present invention. Any recited method can be carried out in the order of events recited or in any possible logical order.

In various embodiments, the present system and method pertain to producing hydroxide and/or bicarbonate and/or carbonate ions in an aqueous solution by a low-voltage, low-energy electrochemical process. In one embodiment, and with reference to FIG. 1, hydroxide ions are produced in a cathode electrolyte 102 by applying a voltage of less than 3V across the cathode 104 and anode 108, while: i) oxidizing hydrogen gas at the anode 108 to produce protons; ii) migrating protons from the anode 108 through the anode electrolyte 106 and across a second cation exchange membrane 118 to a fourth electrolyte 116; iii) holding the voltage across the anode 108 and cathode 104 to a level such that a gas does not form at the anode 108; iv) reducing water at the cathode 104 to form hydroxide ions and hydrogen gas; v) preventing hydroxide ions in the cathode electrolyte 102 from migrating from the cathode electrolyte 102 to the adjacent third electrolyte 110 by positioning a first cation exchange membrane 112 between the cathode electrolyte 102 and the third electrolyte 110; vi) migrating sodium ions from the third electrolyte 110 to the cathode electrolyte 102 where they combine with hydroxide ions to form sodium hydroxide in the cathode electrolyte 102; vii) migrating chloride ions from the third electrolyte 110 across an anion exchange membrane 120 to the fourth electrolyte 116 where they combine with protons migrated from the anode 108 to form hydrochloric acid; and vii) separating the anode electrolyte 106 from the fourth electrolyte 116 by a second cation exchange membrane 118.

In various embodiments, hydrogen gas obtained at the cathode is directed to the anode where the gas is oxidized. In various embodiments, sodium hydroxide produced in the cathode electrolyte and hydrochloric acid produced in the fourth electrolyte are continually removed from the system, while the cathode electrolyte and sodium chloride in the third electrolyte are continually replenished with water to maintain a continuous production operation of the system. In other embodiments, the system and method are adapted for other modes of operation, e.g., batch or semi-batch flows.

In another embodiment, bicarbonate ions and/or carbonate ions are produced in the cathode electrolyte by dissolving carbon dioxide gas in the cathode electrolyte and applying a voltage of less than 3V across the anode and cathode. The carbon dioxide gas may be dissolved in the cathode electrolyte or may be dissolved in a separate carbon dioxide compartment 152 connected to the cathode electrolyte compartment 122 to provide carbon dioxide, dissolved in a solution, to the cathode electrolyte compartment. In this embodiment, since carbon dioxide is dissolved in the cathode electrolyte, three reactions occur as follows:

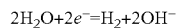

(water is reduced at the cathode),

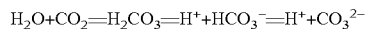

(carbonate and/or bicarbonate ions are formed in the cathode electrolyte, depending on the pH of the electrolyte), and

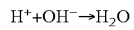

As these reactions are pH dependent, the overall cathode reaction is: either: $2H_2O+2CO_2+2e^-=H_2+2HCO_3^-$, or $H_2O+CO_2+2e^-=H_2+CO_3^{2-}$ or a combination of both reactions, depending on the pH of the cathode electrolyte.

In this embodiment, and with reference to FIG. 1, bicarbonate ions and/or carbonate ions are produced in a cathode electrolyte 102 by applying a voltage of less than 3V across the cathode 104 and anode 108, while: i) oxidizing hydrogen gas at the anode 108 to produce protons at the anode 108; ii) allowing protons formed at the anode 108 to migrate from the anode 108 through the anode electrolyte 106 and across the second cation exchange membrane 118 to the fourth electrolyte 116; iii) applying a voltage across the anode 108 and cathode 104 such that a gas does not form at the anode 108; iv) producing hydrogen gas at the cathode 104 and optionally circulating the gas to the anode 108; v) preventing carbonate ions and/or bicarbonate anions produced in the cathode electrolyte 102 from migrating to the adjacent third electrolyte 110 by positioning the first cation exchange membrane 112 between the cathode electrolyte 102 and the third electrolyte 110, wherein the cation exchange membrane is selected to block migration of anions from the cathode electrolyte 102; vi) migrating sodium ions from the third electrolyte 110 to the cathode electrolyte 102 through the first cation exchange membrane 112; vii) in the cathode electrolyte 102, combining sodium ions with carbonate ions and/or bicarbonate ions to form sodium carbonate and/or sodium bicarbonate in the cathode electrolyte 102; viii) migrating chloride ions from the third electrolyte 110 across the anion exchange membrane 120 to the fourth electrolyte 116; ix) in the fourth electrolyte 116, combining chloride ions with protons migrated from the anode electrolyte 106 to form hydrochloric acid; and x) preventing chloride ions from migrating from the fourth electrolyte 116 to the anode electrolyte 106 by positioning the second cation exchange membrane between the fourth electrolyte 116 and the anode electrolyte 106, wherein the second cation exchange membrane 118 is selected to block migration of anions from the fourth electrolyte 116 to the anode electrolyte 106.

In this embodiment of the system, as with the embodiment that produces hydroxide ions described above, hydrogen gas produced at the cathode is optionally directed to the anode where it is oxidized, or the gas is vented. In embodiments where the hydrogen gas is vented, another source of hydrogen gas provides the hydrogen gas to the anode. In various embodiments of this system, as with the production of hydroxide ions, the carbonate ions and/or bicarbonate ions produced in the cathode electrolyte are continually removed from the system while the cathode electrolyte and sodium chloride in the third electrolyte are continually replenished with water to maintain continuous operation of the system. In various embodiments, the system and method are adaptable for other modes of operation, e.g., batch or semi-batch flows.

In various embodiments, as will be appreciated by one ordinarily skilled in the art, the voltage across the anode and cathode is dependent on the pH of the anode electrolyte and cathode electrolyte, as well as the pH difference between these electrolytes. Thus, in various embodiments, hydroxide ions, carbonate ions and/or bicarbonate ions are produced in the cathode electrolyte when the voltage applied across the anode and cathode is less than 3, 2.9 2.8, 2.7, 2.6 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 V or less, while the pH of difference between the anode electrolyte and the cathode electrolyte, is 0, 1, 2, 3, 4, 5, 6, 7, 8, 9, 10, 11, 12, 13, 14 pH units or greater; and while the pH of the anode electrolyte varies from 1 to 7 pH units and the pH of the cathode electrolytes varies from 7 to 14 pH units or greater.

In various embodiments, and with reference to FIG. 1, by selectively placing the second cation exchange membrane 118 between the anode electrolyte 106 and the fourth electrolyte 116, and on applying the present voltage across the anode 108 and cathode 104, protons formed by oxidation of hydrogen gas at the anode 108 migrate into the anode electrolyte 106 from where they migrate to the fourth electrolyte 116 through the second cation exchange membrane 118. However, since the fourth electrolyte 116 is separated from the third electrolyte 110 by the anion exchange membrane 120, further migration of the protons from the fourth electrolyte 116 towards the cathode through the third electrolyte 110 is blocked; thus, protons accumulate in the fourth electrolyte 116 to form an acid, e.g., hydrochloric acid.

Similarly, and with reference to FIG. 1, by selectively placing the first cation exchange membrane 112 between cathode electrolyte 102 and the third electrolyte 110, and on applying the low voltage across the anode 108 and cathode 104, hydroxide ions or carbonate ions or bicarbonate ions form in the cathode electrolyte 102 from where their migration to the third electrolyte 110 is blocked by the first cation exchange membrane 112. Consequently, hydroxide ions, or carbonate ions or bicarbonate ions are contained in the cathode electrolyte 102. At the same time, hydrogen gas formed at the cathode 104 from reduction of water at the cathode 104 is vented or is directed to the anode for oxidation of the gas at the anode. If the hydrogen is vented, then an alternative exogenous source of hydrogen is utilized to provide the hydrogen gas to the anode.

In various embodiments, and with reference to FIG. 1, since the first cation exchange membrane 112 allows migration of cations from the third electrolyte 110 to the cathode electrolyte 102, and the anion exchange membrane 120 allows migration of anions from the third electrolyte 110 to the fourth electrolyte 116, on application of the voltage across the anode and cathode, cations, e.g., sodium ions, will migrate from the third electrolyte 110 to the cathode electrolyte 102, and anions, e.g., chloride ions will migrate from the third electrolyte 110 to the fourth electrolyte 116.

Thus, in embodiments where the third electrolyte 110 is initially charged with sodium chloride, sodium ions will migrate from the third electrolyte to the cathode electrolyte 102 to form sodium hydroxide or sodium bicarbonate or sodium carbonate, depending on the pH of the cathode electrolyte 102. Similarly, chloride ions will migrate from the third electrolyte 110 to the fourth electrolyte to form hydrochloric acid 148 with protons that migrate from the anode electrolyte 106. Consequently, in various embodiments, a partially desalinated water 150 from which sodium ions and chloride are removed is produced in the third electrolyte 110.

In various embodiments where hydrogen gas is not provided for oxidation at the anode, the system and method is adaptable to produce a gas at the anode, e.g., oxygen or chlorine, while producing hydroxide, bicarbonate and carbonate ions in the cathode electrolyte and hydrogen gas at the cathode. As with other embodiments, in this embodiment the system and method are adaptable to form an acid in the fourth electrolyte and a partially desalinated water in the third electrolyte, while forming a gas, e.g., oxygen or chlorine, at the anode. In this embodiment, however, since hydrogen gas is not oxidized at the anode, a higher voltage is generally required across the cathode and anode to drive the electrochemical reaction in the system.

In various embodiments, and with reference to FIG. 1, with the voltages as described herein applied across the cathode 104 and anode 108, protons that form at the anode and migrate into the anode electrolyte 106 and to the fourth electrolyte 116 across the second cation exchange membrane 118 may cause the pH of the anode electrolyte 106 and the fourth electrolyte 116 to adjust, depending on the flow of the electrolytes through the system. At the same time, as hydroxide ions, bicarbonate ions or carbonate ions that form in the cathode electrolyte 102 are prevented from migrating from the cathode electrolyte across the first cation exchange membrane, the pH of the cathode electrolyte 102 may adjust, depending on the flow of the electrolytes through the system. Thus, in various embodiments, a pH differential is obtained between the cathode electrolyte 102 and anode electrolyte 106, e.g., a difference of at least 1, 2, 3, 4, 5, 6, 7, 8, 9, 10, 11, 12, 13 or 14 pH units or more, depending on the flow of the electrolytes through the system. Similarly, due to the migration of protons to the fourth electrolyte 116 from the anode electrolyte 106, a pH differential is obtained between the fourth electrolyte 116 and the cathode electrolyte 102, e.g., a difference of at least 1, 2, 3, 4, 5, 6, 7, 8, 9, 10, 11, 12, 13 or 14 pH units or more, depending on the flow of the electrolytes through the system.

In the following exemplary description of a specific embodiment of the system and method, for illustrative purposes, a system is configured as in FIG. 1 wherein a concentrated aqueous solution of sodium chloride 142 is used as the initial third electrolyte 110 between the first cation exchange membrane 112 and the anion exchange membrane 120. Also in this system, an electrically conductive water or a low concentration of sodium hydroxide solution or sodium bicarbonate solution or sodium carbonate solution is used as the initial cathode electrolyte 102; and in this system an electrically conductive water is used as the anode electrolyte 106; and further in this system a low concentration of the hydrochloric acid produced in the fourth electrolyte 116 is used as the initial fourth electrolyte.

Thus in this system, on applying a voltage across the anode 108 and cathode 104, sodium ions will migrate from the third electrolyte 110 to the cathode electrolyte 102, and chloride ions will migrate from the third electrolyte to the fourth electrolyte 116; hydroxide ions, or carbonate ions or bicarbonate ions will be produced in the cathode electrolyte 102 (depending on whether carbon dioxide gas is added to the electrolyte); hydrogen gas will be produced at the cathode 104; hydrogen gas supplied to the anode 108 will be oxidized to protons at the anode; and the protons will migrate into the anode electrolyte 106 from where they will migrate across the second cation exchange membrane 118 to the fourth electrolyte 116 where they accumulate, as the anion exchange membrane 120 will block their further migration to the third electrolyte 110.

Consequently, in various embodiments, on applying a voltage across the anode and cathode in this system, sodium hydroxide will be produced in the cathode electrolyte; hydrochloric acid will be produced in the fourth electrolyte; the concentration of sodium chloride in the third electrolyte will decrease; hydrogen gas will be oxidized at the anode; and hydrogen gas will be generated at the cathode.

In an embodiment of this system where carbon dioxide gas is dissolved in the cathode electrolyte, the system and method additionally will produce bicarbonate and/or carbonate ions in the cathode electrolyte; hence, in this embodiment, sodium bicarbonate and/or sodium carbonate will be produced in the cathode electrolyte, depending on the pH of the cathode electrolyte. In this embodiment, as with the embodiment wherein carbon dioxide is not dissolved in the cathode electrolyte, the system and method will produce hydrochloric acid in the fourth electrolyte; the concentration of sodium chloride in the third electrolyte will decrease; hydrogen gas will be oxidized at the anode; and hydrogen gas will be generated at the anode.

As will be appreciated by one ordinarily skilled in the art, the present system and method are not limited to this exemplary use of sodium chloride solution as the third electrolyte, but are adaptable for using an equivalent ionic salt solution in the third electrolyte, e.g., a potassium sulfate. Thus, for example, if potassium sulfate were used, sulfuric acid will be produced in the fourth electrolyte and potassium hydroxide, bicarbonate and/or carbonate will be produced in the cathode electrolyte. As can be appreciated, the system and method with potassium sulfate as the third electrolyte will produce protons at the anode by oxidizing hydrogen gas supplied to the anode; hydrogen gas will form at the cathode; and the third electrolyte will be depleted of potassium and sulfate ions. In embodiments where carbon dioxide gas is dissolved in the cathode electrolyte, the system and method with potassium sulfate as the third electrolyte will produce bicarbonate and carbonate ions in the cathode electrolyte. Hence, in this equivalent system, potassium hydroxide, potassium bicarbonate and/or potassium carbonate will be produced in the cathode electrolyte, depending on the pH of the cathode electrolyte. Other electrolytes that can be used to produce the electrolytes in the present system include seawater, brackish water and brines. Such equivalent systems and methods are therefore within the scope of the present system and method.

Also as will be appreciated by one skilled in the art, in the embodiment where carbon dioxide is dissolved in the cathode electrolyte to produce bicarbonate and carbonate anions, other equivalent gases that react dissolve and ionize in water will produce equivalent results. Thus, for example, acidic gases such as sulfur dioxide and oxides of nitrogen that are soluble in the cathode electrolyte will produce equivalent anions in the cathode electrolyte. Therefore, to the extent that an equivalent gas is dissolved in the third electrolyte to produce equivalent anions as with carbon dioxide, such systems and methods are also within by the scope of the present system and method.

In various embodiments, the system and method are adapted to withdraw some or the entire cathode electrolyte from an outflow to an inflow stream of the cathode compartment. Also, the system and method are adapted to withdraw some or the entire fourth electrolyte from an outflow stream to an inflow stream of the fourth electrolyte. In various embodiments, the system and method are adapted for batch, semi-batch or continuous flow operation, with or without directing hydrogen gas generated at the cathode for oxidation at the anode, and with or without withdrawing and replenishing the electrolytes in the system.

In various embodiments, the system includes a hydrogen gas transfer system for circulating hydrogen gas from the cathode to the anode. In another embodiment, the system includes a carbon dioxide delivery system for dissolving carbon dioxide gas in the cathode electrolyte. In various embodiments, the system is operably connected to an industrial waste gas stream comprising combustion gases for supplying gases, e.g., carbon dioxide, to the cathode electrolyte. In various embodiments, the waste gas stream includes combustion gases from fossil fuelled electrical power generating plants, cement manufacturing plants and other industrial plants. In various embodiments, the waste gas includes acidic gases, e.g., oxides of nitrogen (nitrous oxide, nitric oxide) and sulfur gases (sulfur dioxide, hydrogen sulfide) that dissolve in the cathode electrolyte to form anions analogous to the production of bicarbonate and carbonate ions when carbon dioxide is dissolved in the cathode electrolyte.

Referring to FIG. 1, in one embodiment, the system 100 comprises: a first electrolyte that is a cathode electrolyte 102 in contact with a cathode 104; a second electrolyte that is anode electrolyte 106 contacting an anode 108; a third electrolyte 110 separated from the cathode electrolyte 102 by a first cation exchange membrane 112; a fourth electrolyte 116 separated from the anode electrolyte 106 by a second cation exchange membrane 118; a third ion-exchange membrane 120 separating the third electrolyte 110 and fourth electrolytes 116. In various embodiments, the first ion-exchange membrane comprises a cation exchange membrane; the second ion-exchange membrane comprises a cation exchange membrane; and the third ion-exchange membrane comprises an anion exchange membrane.

In the system illustrated in FIG. 1, cathode electrolyte 102 is in fluid contact with cathode 104 and both are contained in a first cell 122 defined by first cation exchange membrane 112 and first sidewall 124. Similarly, anode electrolyte 106 is in fluid contact with anode 108 and both are contained in a second cell 126 defined by second cation exchange membrane 118 and second sidewall 128. Third cell 130 containing third electrolyte 110 is defined by first cation exchange membrane 112 and anion exchange membrane 120; and fourth cell 132 containing fourth electrolyte 116 is defined by anion exchange membrane 120 and second cation exchange membrane 118.

Also with reference to FIG. 1, system 100 in various embodiments includes a voltage supply 134 that is capable of applying a voltage across the anode 108 and the cathode 104. In various embodiments the cathode and anode in the system are comprised of an un-reactive, conductive material such as nickel or platinum. The system includes a hydrogen gas circulating system 136 adapted for circulating hydrogen gas generated at the cathode 104 for oxidation at the anode 108. In various embodiments, the hydrogen gas is operationally connected to an external supply of hydrogen (not shown) to provide hydrogen gas to the anode, e.g., at start-up of operations when the hydrogen supply from the cathode is insufficient.

In various embodiments, the system includes a cathode electrolyte withdrawal and replenishing system 138 adapted for withdrawing all of, or a portion of, the cathode electrolyte 102 from the first cell 122 containing the cathode electrolyte. In various embodiments the system includes a fourth electrolyte withdrawal and replenishing system 140 for withdrawing and replenishing all of, or a portion of, the fourth electrolyte 116 to the fourth cell 132 containing the fourth electrolyte. In various embodiments, the system includes a salt supply system for providing a salt solution 142, e.g., concentrated sodium chloride, to the third electrolyte cell 130. In various embodiments the system includes a gas supply system 144 for providing a gas, e.g., carbon dioxide, to the cathode electrolyte 102. In various embodiments the system includes a carbon dioxide mixing system 152 in which carbon dioxide is supplied to the cathode electrolyte by dissolving the gas into the cathode in one or more compartments located in the outflow stream, or in an inflow stream or in between them. In various embodiments, the system includes inlet ports (not shown) for introducing fluids into the cells (122, 126, 130, 132) and outlet ports (not shown) for removing fluids from the cells.

In various operating modes, e.g., continuous flow, batch flow or mixed modes, the system when charged with sodium chloride solution 142 will produce a solution of sodium hydroxide 146 in the cathode electrolyte 102, hydrochloric acid 148 in the fourth electrolyte 116, and an a partially desalinated aqueous solution 150 in which the cation and anion content is reduced. In various embodiments, the aqueous partially desalinated solution 150 is utilized feed water to a desalinated water treatment plant (not shown) for further processing to remove e.g., other ions present in the solution. In other embodiments, the aqueous solution 150 is used to prepare the initial electrolyte solutions for charging the first cell 122, second cell 126, third cell 130 and fourth cell 132 with an electrolyte.

As can be appreciated, in various embodiments and with reference to FIG. 1, although: i) the cathode electrolyte 102 is separated from the third electrolyte 110 by the first cation exchange membrane 112; and ii) the fourth electrolyte 116 is separated from the anode electrolyte 106 by the second cation exchange membrane 118; and iii) the fourth electrolyte 116 is separated from the third electrolyte 110 by the anion exchange membrane 120; nevertheless, when a voltage 134 is applied across the anode 108 and cathode 104, the negatively charged anions ions in the electrolytes will attempt to migrate towards the positive anode 108, and positively charged cations will attempt to migrate towards the negative cathode 104 through the first cation exchange membrane 112, the second cation exchange membrane 118 and the anion exchange membrane 120.

Thus, for example, with reference to FIG. 1, where the cathode electrolyte 102 and the anode electrolyte 106 are initially made conductive by adding a small amount of sodium hydroxide and hydrochloric acid respectively to the electrolytes; and the fourth electrolyte 116 is an aqueous solution initially made conductive by the adding a small amount of hydrochloric acid to the solution; and initially a concentrated solution of sodium chloride is placed in the third electrolyte 110; and initially a stream of hydrogen gas 136 is directed to the anode 108 through the anode electrolyte 106 for oxidation at the anode 108, on application of the voltage 134 across the anode 108 and cathode 104, protons will form at the anode 108 from oxidation of hydrogen gas 136 supplied to the anode, while hydroxide ions and hydrogen gas 138 will form at the cathode electrolyte 116 from the reduction of water, as follows:

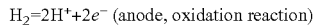

$H_2 = 2H^+ + 2e^-$ (anode, oxidation reaction)

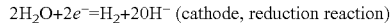

$2H_2O + 2e^- = H_2 + 2OH^-$ (cathode, reduction reaction)

As will be appreciated by one ordinarily skilled in the art and with reference to FIG. 1, since protons are formed at the anode 108 from hydrogen gas 136 provided to the anode 108; and since a gas such as oxygen does not form at the anode 108; and since water is electrolyzed in the cathode electrolyte to form hydroxide ions and hydrogen gas 138 at the cathode 104, therefore when a voltage is applied across the anode 108 and cathode 104, the system will produce hydroxide ions in the cathode electrolyte 102 and protons in the anode electrolyte 106.

Further, as can be appreciated by one skilled in the art, in the present system since a gas does not form at the anode, the system will produce hydroxide ions in the cathode electrolyte and hydrogen gas at the anode when less than 3V is applied across the anode and cathode, in contrast to the higher voltage that is required in conventional systems that does generate gas, e.g., chlorine at the anode. For example, in various embodiments, hydroxide ions are produced when less than 2.0, 1.5, 1.4, 1.3, 1.2, 1.1, 1.0, 0.9, 0.8, 0.7, 0.6, 0.5, 0.4, 0.3, 0.2, 0.1 V or less is applied across the anode and cathode.

Further, as will be appreciated by those ordinarily skilled in the art and with reference to FIG. 1, on applying a voltage across the anode 108 and cathode 104, the positively charged protons formed at the anode will attempt to migrate to the cathode 104 through the anode electrolyte 106, while the negatively charged hydroxide ions formed at the cathode 104 will attempt to migrate to the anode 108 through the cathode electrolyte 102.

However, as is illustrated in FIG. 1 and with reference to the hydroxide ions in the cathode electrolyte 102, since the first cation exchange membrane 112 will contain the cathode electrolyte 102 within first cell 122, and since the first cation exchange membrane 112 will prevent the migration of anions from the cathode electrolyte 102 to the third electrolyte 110, the hydroxide ions generated in the cathode electrolyte 102 will be prevented from migrating out of the cathode electrolyte through the first cation exchange membrane 112. Consequently, on applying the voltage 134 across the anode and cathode, the hydroxide ions produced at the cathode will be contained in the cathode electrolyte 102. Thus, depending on the flow rate of fluids into and out of the cathode electrolyte, the pH of the cathode electrolyte will adjust, e.g., the pH may increase, decrease or remain the same.

Similarly with reference to protons generated at the anode 108, under the applied voltage 134 across the cathode 104 and anode 108, the protons will enter the anode electrolyte 106 and migrate to the fourth electrolyte through the second cation exchange membrane 118. However, since the anion exchange membrane 120 between the fourth electrolyte 116 and the third electrolyte 110 will block the movement of cations from the fourth electrolyte 116 to the third electrolyte 116, consequently, protons in the fourth electrolyte 116 will be prevented from migrating from the fourth electrolyte to the third electrolyte 110. Consequently, on applying the voltage 134 across the anode and cathode, the protons produced at the anode will be contained in the fourth electrolyte 116. Thus, depending on the flow rate of fluids into and out of the fourth electrolyte the pH of the fourth electrolyte will adjust, e.g., the pH may increase, decrease or remain the same.

With reference to the third electrolyte 110 that is initially charged with a concentrated solution of sodium and chloride ions and contained in the third cell 130 by the anion exchange membrane 120 and the first cation exchange membrane 112, on applying a voltage across the anode 108 and cathode 104, anions in the third electrolyte 110, e.g., chloride ions, will attempt to migrate to the anode 108, while cations, e.g., sodium ions in the third electrolyte, will attempt to migrate to the cathode 104. Since the anion exchange membrane 120 will allow the migration of anions from the third electrolyte 110 to the fourth electrolyte 116, chloride ions present in the third electrolyte 110 will migrate to the fourth electrolyte where they will form an acid, e.g., hydrochloric acid, with the protons from the anode.

Further, since the first cation exchange membrane 112 will allow the migration of cations from the third electrolyte 110 to the cathode electrolyte 102, sodium ions present in the third electrolyte 110 will migrate to the cathode electrolyte 102 where they will form sodium hydroxide with the hydroxide ions generated at the cathode 104. Consequently, as is illustrated in FIG. 1, on application of a voltage across the anode 108 and cathode 104, the cations, e.g., sodium ions, and anions, e.g., chloride ions will migrate out of the third electrolyte 110, thereby forming a desalinated water in the third electrolyte.

In various embodiments and as is illustrated in FIG. 1, hydrogen gas 120 is generated at the cathode 104 from reduction of water in the cathode electrolyte. This gas can be vented from the cathode or directed to the anode 108 where it is oxidized to protons as described herein.

In other embodiments, depending on the ionic species desired, alternative reactants can be dissolved in the cathode electrolyte to produce the desired ions. Thus, for example, in various embodiments, carbon dioxide is added to the cathode electrolyte to produce carbonate and bicarbonate ions. The carbon dioxide gas can be added to the electrolyte by bubbling it directly into the electrolyte; alternatively, the carbon dioxide gas may be dissolved in the cathode electrolyte or may be dissolved in a separate compartment 152 connected to the cathode compartment by a conduit to feed the solution with carbon dioxide dissolved into the cathode compartment as noted above.

In embodiments where carbon dioxide is dissolved in the cathode electrolyte, as discussed above and with reference to FIG. 1, on applying the voltage across the anode 108 and cathode 104, the system 100 will produce hydroxide ions, bicarbonate ions, carbonate ions and hydrogen gas as follows:

At the cathode 104, water is reduced to hydroxide ions and hydrogen gas as follows:

$$2H_2O+2e^-=H_2+2OH^- \text{ (water is reduced at the cathode)}.$$

In the cathode electrolyte 102, the carbon dioxide gas will dissolve to form carbonic acid, protons, bicarbonate ions, and carbonate ions, depending on the pH of the electrolyte, as follows:

$$H_2O+CO_2=H_2CO_3=H^++HCO_3^-=2H^++CO_3^{2-}$$

Figure 4:
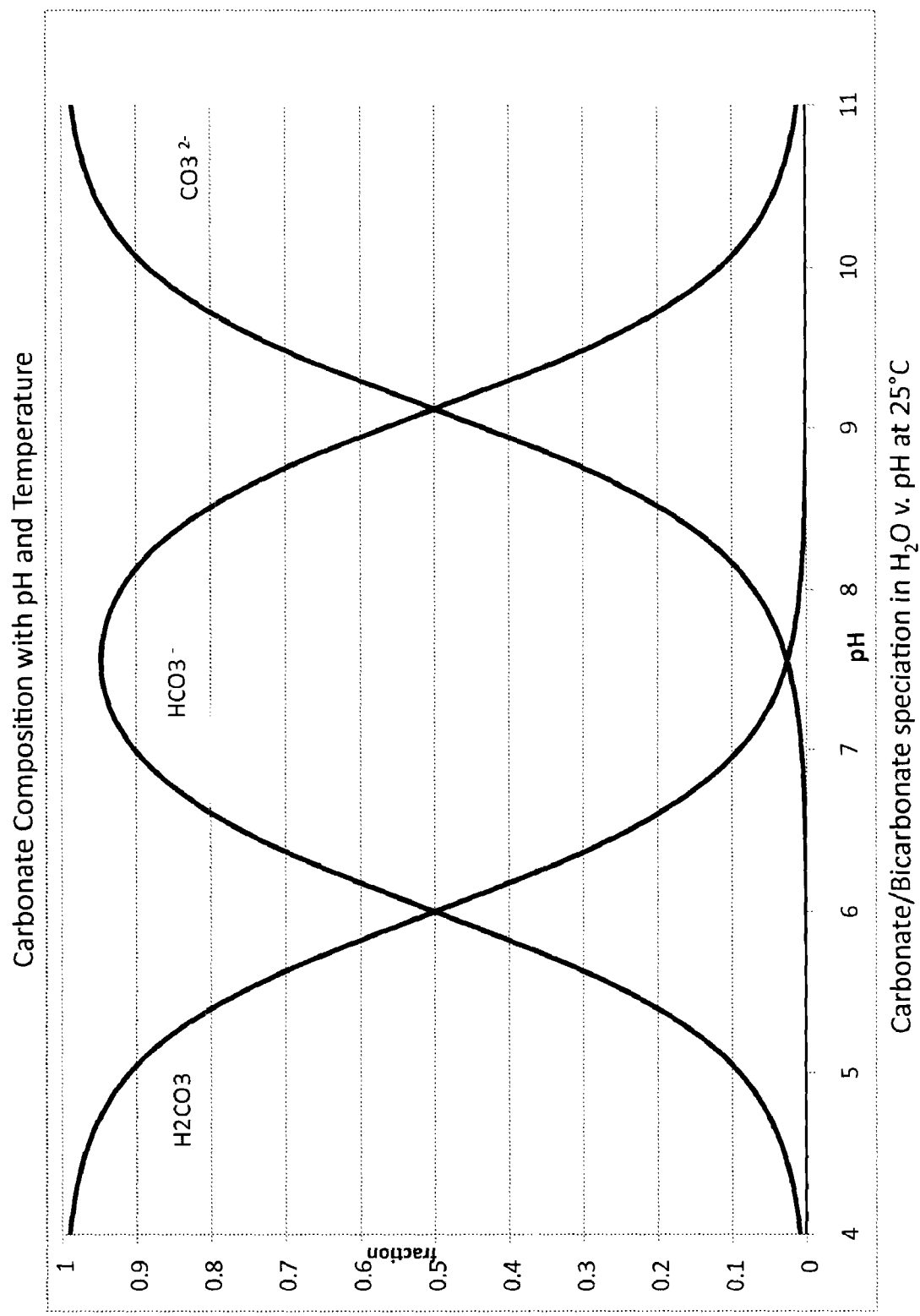
FIG. 4. illustrates Carbonate/Bicarbonate speciation in $H_2O$.

As the dissolution of carbon dioxide and the concentration of bicarbonate and carbonate ions in the cathode electrolyte 102 are pH dependant, the overall reaction in the first (cathode) cell 122 is either:

$$2H_2O+2CO_2+2e^-=H_2+2HCO_3^-; \text{ or} \quad\quad \text{Scenario 1}$$

$$H_2O+CO_2+2e^-=H_2+CO_3^{2-} \quad\quad \text{Scenario 2}$$

or a combination of both, depending on the pH of the cathode electrolyte 102, as is illustrated in FIG. 4.

For either scenario the overall cell potential can be determined through the Gibbs energy change of the reaction by the formula:

$$E_{cell}=-\Delta G/nF$$

Figure 5:
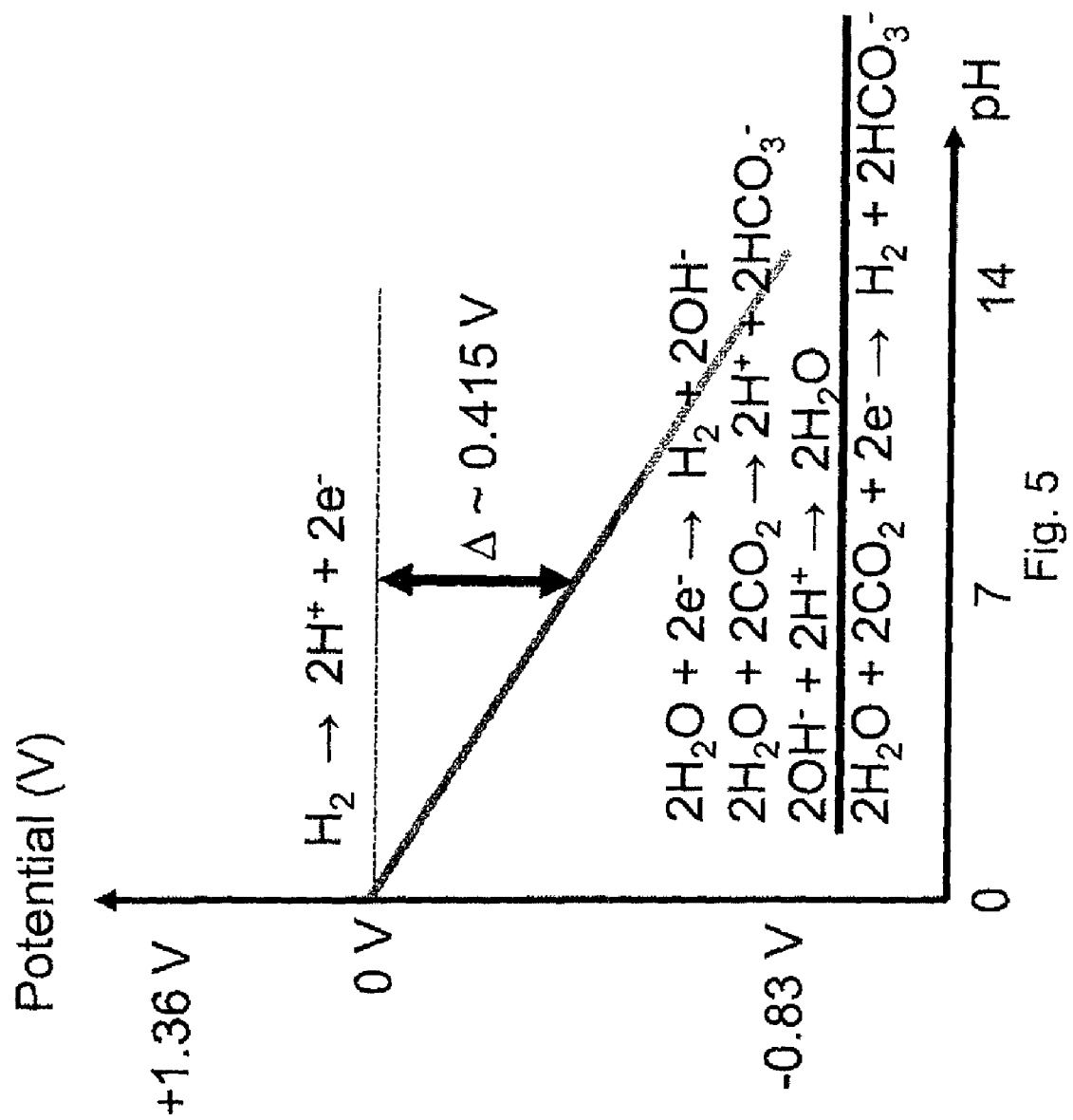
FIG. 5 illustrates a cell potential as a function of pH.

Or, at standard temperature and pressure conditions:

$$E°_{cell}=-\Delta G°/nF$$

where, $E_{cell}$ is the cell voltage, $\Delta G$ is the Gibbs energy of reaction, n is the number of electrons transferred, and F is the Faraday constant (96485 J/Vmol). The $E_{cell}$ of each of these reactions is pH dependent based on the Nernst equation as demonstrated for Scenario 1 in FIG. 5

For either scenario the overall cell potential can be determined through the combination of Nernst equations for each half cell reaction:

$$E=E°-RTln(Q)/nF$$

where, $E°$ is the standard reduction potential, R is the universal gas constant, (8.314 J/mol K) T is the absolute temperature, n is the number of electrons involved in the half cell reaction, F is Faraday's constant (96485 J/V mol), and Q is the reaction quotient so that:

$$E_{total}=E_{cathode}+E_{anode}.$$

When hydrogen is oxidized to protons at the anode as follows:

$$H_2=2H^++2e^-,$$

E° is 0.00 V, n is 2, and Q is the square of the activity of $H^+$ so that:

$$E_{anode}=-0.059\ pH_a,$$

where $pH_a$ is the pH of the anode electrolyte.

When water is reduced to hydroxide ions and hydrogen gas at the cathode as follows:

$$2H_2O+2e^-=H_2+2OH^-,$$

E° is –0.83 V, n is 2, and Q is the square of the activity of $OH^-$ so that:

$$E_{cathode}=-0.059\ pH_c,$$

where $pH_c$ is the pH of the cathode electrolyte.

For either Scenario, the E for the cathode and anode reactions varies with the pH of the anode and cathode electrolytes. Thus, for Scenario 1 if the anode reaction, which is occurring in an acidic environment, is at a pH of 0, then the E of the reaction is 0 V for the half cell reaction. For the cathode reaction, if the generation of bicarbonate ions occur at a pH of 7, then the theoretical E is 7×(0.059 V)=0.413 V for the half cell reaction where a negative E means energy is needed to be input into the half cell or full cell for the reaction to proceed. Thus, if the anode pH is 0 and the cathode pH is 7 then the overall cell potential would be 0.413 V, where:

$$E_{total}=0.059(pH_a-pH_c)=0.059\ \Delta pH.$$

For Scenario 2 in which carbonate ions are produced, if the anode pH is 0 and the cathode pH is 10, this would represent an E of 0.59 V.

Thus, in various embodiments, an effect of directing $CO_2$ into the cathode electrolyte (to lower the pH of the cathode electrolyte and to produce bicarbonate ions and/or carbonate ions in the cathode electrolyte) is a lowering of the required voltage across the anode and cathode of the system to produce the hydroxide, carbonate and bicarbonate in the cathode electrolyte. In Scenario 1, it can be appreciated that if the cathode electrolyte was allowed to increase to a pH of 14 or greater, the difference between the anode half-cell potential (represented as the thin dashed horizontal line) and the cathode half cell potential (represented as the thick solid sloping line) would increase to 0.83V. With increased duration of cell operation without $CO_2$ addition or other intervention, e.g., diluting with water, the required cell potential would continue to increase. It can thus be appreciated that operation of the electrochemical cell with the cathode pH at 7 or greater provides a significant energy savings.

Thus, as can be appreciated by one ordinarily skilled in the art, for different pH values in the cathode electrolyte and the anode electrolyte, hydroxide ions, carbonate ions and/or bicarbonate ions are produced in the cathode electrolyte when the voltage applied across the anode and cathode is less than 3, 2.9 2.8, 2.7, 2.6 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 V or less, while the pH difference between the anode electrolyte and the cathode electrolyte is greater 0, 1, 2, 3, 4, 5, 6, 7, 8, 9, 10, 11, 12, 13, 14 or greater.

Also as will be appreciated by one skilled in the art, in embodiments wherein it is desired to produce bicarbonate and/or carbonate ions, the system as illustrated in FIG. 1, and as described above with reference to production of hydroxide ions is adaptable to produce bicarbonate ions and/or carbonate ions in the cathode electrolyte 102 by dissolving carbon dioxide in the cathode electrolyte 102 and applying a voltage of less than 3V, or less than 2.5 V, or less than 2 V, or less than 1.5 V across the cathode 104 and anode 108, while: i) oxidizing hydrogen gas at the anode 108 to produce protons at the anode 108; ii) allowing protons formed at the anode 108 to migrate from the anode 108 through the anode electrolyte 106 and across the second cation exchange membrane 118 to the fourth electrolyte 116; iii) applying a voltage across the anode 108 and cathode 104 such that a gas does not form at the anode 108; iv) producing hydrogen gas at the cathode 104 and optionally circulating the gas to the anode 108; v) preventing carbonate ions and/or bicarbonate anions produced in the cathode electrolyte 102 from migrating to the adjacent third electrolyte 110 by positioning the first cation exchange membrane 112 between the cathode electrolyte 102 and the third electrolyte 110, wherein the cation exchange membrane is selected to block migration of anions from the cathode electrolyte 102; vi) migrating sodium ions from the third electrolyte 110 to the cathode electrolyte 102 through the first cation exchange membrane 112; vii) in the cathode electrolyte 102, combining sodium ions with carbonate ions and/or bicarbonate ions to form sodium carbonate and/or sodium bicarbonate in the cathode electrolyte 102; viii) migrating chloride ions from the third electrolyte 110 across the anion exchange membrane 120 to the fourth electrolyte 116; ix) in the fourth electrolyte 116, combining chloride ions with protons migrated from the anode electrolyte 106 to form hydrochloric acid; and x) preventing chloride ions from migrating from the fourth electrolyte 116 to the anode electrolyte 106 by positioning the second cation exchange membrane between the fourth electrolyte 116 and the anode electrolyte 106, wherein the second cation exchange membrane 118 is selected to block migration of anions from the fourth electrolyte 116 to the anode electrolyte 106.

Thus, in producing carbonate/bicarbonate ions in the cathode electrolyte 102, as with the embodiment that produces hydroxide ions in the cathode electrolyte without the addition of carbon dioxide to the cathode electrolyte as described above, the anode 108, the first cation exchange membrane 118, the anion exchange membrane 120, the first cation exchange membrane 112, the anode electrolyte, the fourth electrolyte and the third electrolyte are functionally identical.

As with the production of hydroxide ions, in the production of carbonates and or bicarbonates, hydrogen gas 136 produced at the cathode 104 is optionally directed for oxidization of the hydrogen gas at the anode 108; a desalinated water 150 depleted of sodium chloride is obtained from the third electrolyte 110, and hydrochloric acid 148 is produced in the fourth electrolyte. Also, in various embodiments as with the production of hydroxide ions, the carbonate ions or bicarbonate ions produced in the cathode electrolyte can be continually removed from the system while water in the cathode electrolyte and sodium chloride in the third electrolyte are continually replenished to maintain a continuous operation of the system. In various embodiments, the system and method are adaptable for other modes of operation, e.g., batch or semi-batch flows.

As can be appreciated by one skilled in the art, in various embodiments, the system can be configured to operate in various production modes including batch mode, semi-batch mode, continuous flow mode, with or without the option to withdraw portions of the sodium hydroxide produced in the cathode electrolyte, or withdraw all or a portions of the acid produced in the fourth electrolyte, or direct the hydrogen gas produced at the cathode to the anode where it may be oxidized.

In various embodiments, the hydroxide ions, bicarbonate ions and/or carbonate ion solutions are produced in the cathode electrolyte when the voltage applied across the anode and cathode is less than 3, 2.9 or less, 2.8 or less, 2.7 or less, 2.6 or less, 2.5 or less, 2.4 or less, 2.3 or less, 2.2 or less, 2.1 or less, 2.0 or less, 1.9 or less, 1.8 or less, 1.7 or less, 1.6, or less 1.5 or less, 1.4 or less, 1.3 or less, 1.2 or less, 1.1 or less, 1.0 or less, 0.9 or less or less, 0.8 or less, 0.7 or less, 0.6 or less, 0.5 or less, 0.4 or less, 0.3 or less, 0.2 or less, or 0.1 V or less.

In another embodiment, the system and method is adaptable to allow for formation of a gas at the anode, e.g., oxygen or chlorine, while hydroxide ions, carbonate ions and bicarbonate ions are produced in the cathode electrolyte and hydrogen gas is generated at the cathode. However, in this embodiment, hydrogen gas is not supplied to the anode. While with this embodiment protons will be produced at the anode, and sodium hydroxide, sodium carbonate, and/or sodium bicarbonate will be produced in the cathode electrolyte, in general the voltage across the anode and cathode will be higher compared to the embodiment when a gas does not form at the anode but, instead, hydrogen gas is oxidized at the anode.

In various embodiments, and with reference to FIG. 1, useable anion exchange membrane 120 include conventional anion exchange ion exchange membranes. Preferably, such membranes should be useable in an acidic and/or basic electrolytic solution temperatures in the range from about 0° C. to about 100° C. or higher. Similarly, first cation exchange membrane 112 and second cation exchange membrane 118 may be selected from conventional cation ion exchange membranes and should be useable in an acidic and/or basic electrolytic solution temperatures in the range from about 0° C. to about 100° C. or higher.

Examples of suitable cation exchange membranes include, e.g., a Teflon™-based membranes available from Asahi Kasei of Tokyo, Japan. In general, exemplary cation exchange membrane should be capable of use in strong basic solutions in a temperature range from about 0° C. to about 120° C. and higher. However, with reference to FIG. 1, as can be appreciated, due to the low voltage and low temperature operation of the present system, other low cost hydrocarbon-based cation exchange membranes can also be utilized. Such hydrocarbon-based membranes are available from e.g., Membrane International of Glen Rock, N.J., USA.

Similarly, typical hydrocarbon based anion exchange membranes are also available from Membrane International of Glen Rock, N.J., USA. In general, such anion exchange membranes should exhibit high ion selectivity, low ionic resistance, high burst strength, and high stability in an acidic electrolytic solution temperature range from about 0° C. to about 100° C. or higher.

As will be appreciated by one skilled in the art, since a cation exchange membrane is selective to migrating cations between two adjacent electrolytes, when a cation exchange membrane is positioned between two electrolytes in an electrochemical system as is illustrated in FIG. 1, the membrane will allow migration of cations from one electrolyte to an adjacent electrolyte in the direction of the cathode. Thus, for example, and with reference to FIG. 1, on applying a voltage across the cathode 104 and an anode 108, cations, e.g., sodium ions, will migrate from the third electrolyte 110 to the cathode electrolyte 102 across the first cation exchange membrane 112. Also as will be appreciated, at the same time, the first cation exchange membrane 112 being selective to cations will block migration of anions from the cathode electrolyte to the third electrolyte 110 in the direction of the anode 108.

Also as will be appreciated by those skilled in the art, since an anion exchange membrane is selective to migrating anions between two adjacent electrolytes, when an anion exchange membrane is positioned between two electrolytes in an electrochemical system as is illustrated in FIG. 1, the membrane will allow migration of anions from one electrolyte to an adjacent electrolyte in the direction of the anode.

Thus, for example, and with reference to FIG. 1, on applying a voltage across the cathode 104 and an anode 108, anions, e.g., chloride ions, will migrate from the third electrolyte 110 to the fourth electrolyte 116 across the anion exchange membrane 120. Also as will be appreciated, at the same time, the anion exchange membrane 120 being selective to anions will block migration of cation from the fourth electrolyte 116 to the third electrolyte 110 in the direction of the cathode 104.

Figure 2:
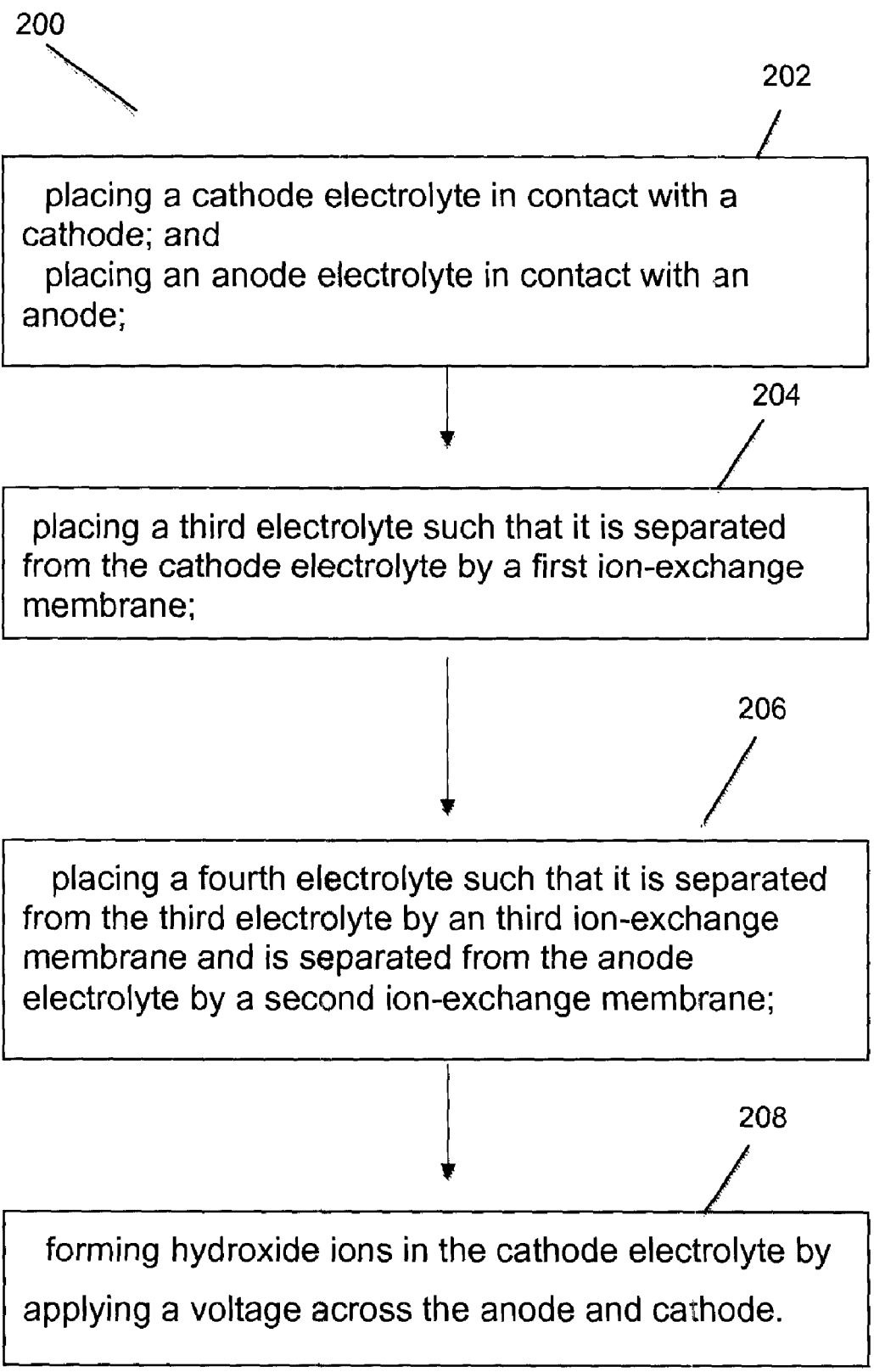
FIG. 2 is a flow chart of an embodiment of the present method.

With reference to FIGS. 1 and 2, the method 200 in one embodiment comprises a step 202 of: e.g., placing a first electrolyte that is a cathode electrolyte in contact with a cathode, and a second electrolyte that is an anode electrolyte in contact with an anode; a step 204 of e.g., placing a third electrolyte such that it is separated from the cathode electrolyte by a first cation exchange membrane; a step 206 of e.g., placing a fourth electrolyte such that it is separated from the third electrolyte by an anion exchange membrane and is separated from the anode electrolyte by a second cation exchange membrane; and a step 208 of e.g., forming hydroxide ions in the cathode electrolyte by applying a voltage across the anode and cathode. In various embodiments, method 200 does not form a gas at the anode when the voltage applied across the anode and cathode is less than 3 or less, 2.9 or less, 2.8 or less, 2.7 or less, 2.6 or less, 2.5 or less, 2.4 or less, 2.3 or less, 2.2 or less, 2.1 or less, 2.0 or less, 1.9 or less, 1.8 or less, 1.7 or less, 1.6 or less, 1.5 or less, 1.4 or less, 1.3 or less, 1.2 or less, 1.1 or less, 1.0 or less, 0.9 or less, 0.8 or less, 0.7 or less, 0.6 or less, 0.5 or less, 0.4 or less, 0.3 or less, 0.2 or less, or 0.1 V or less, while hydrogen gas is provided to the anode where it is oxidized to protons. As will be appreciated by one ordinarily skilled in the art, by not forming a gas at the anode and by providing hydrogen gas to the anode for oxidation at the anode, and by otherwise controlling the resistance in the system, hydroxide ions can be produced in the cathode electrolyte with the present lower voltages.

In various embodiments, method 200 further comprises, a step of e.g., directing carbon dioxide 144 gas into the cathode electrolyte 102; a step of e.g., directing carbon dioxide gas 144 into the cathode electrolyte before or after the cathode electrolyte is placed in contact with the cathode 104; a step of e.g., applying a voltage 134 of less than 3 V, or less than 2V, or less than 1.5V, or less than 1V, or less than 0.5V across the cathode 104 and anode 108; a step of e.g., forming hydrogen gas 136 at the cathode; a step of e.g., forming oxidizing hydrogen to form protons at the anode 108; e.g., a step of forming a pH differential of 1, 2, 3, 4, 5, 6, 7, 8, 9, 10, 11, 12, 13, 14 pH units or greater between the anode and cathode electrolytes without forming a gas at the anode by applying a voltage of less than 3 V, or less than 2V, or less than 1.5V, or less than 1V, or less than 0.5V across the anode and the cathode; a step of forming pH differential of between 1, 2, 3, 4, 5, 6, 7, 8, 9, 10, 11, 12, 13, 14 pH units or greater between the fourth electrolyte 116 and the cathode electrolyte 102 by applying a voltage of 3V or less, or less than 2V, or less than 1.5V, or less than 1.0V, or less than 0.5V across the anode and the cathode; a step of e.g., forming hydroxide ions, bicarbonate ions, carbonate ions and/or a combination thereof in the cathode electrolyte 102; a step of e.g., forming sodium hydroxide, sodium bicarbonate or sodium carbonate in the cathode electrolyte 102; a step of e.g., migrating protons from the anode electrolyte 106 across the second cation exchange membrane 118 to the fourth electrolyte 116; a step of e.g., a step of migrating anions from the third electrolyte 110 across the anion exchange membrane 120 to the fourth electrolyte 116; a step of e.g., migrating chloride ions from the third electrolyte 110 across the anion exchange membrane 120 to the fourth electrolyte 116; a step of e.g., forming an acid 148 in the fourth electrolyte; a step of e.g., forming hydrochloric acid 148 in the fourth electrolyte; a step of e.g., migrating cations from the third electrolyte 110 across the first cation exchange membrane 112 to the cathode 104; a step of e.g., migrating sodium ions from the third electrolyte 110 across the first cation exchange membrane 112 to the cathode electrolyte 102; a step of e.g., directing hydrogen gas formed at the cathode 104 for oxidation of the gas at the anode 108; a step of e.g., removing cathode electrolyte 102 via an outflow and replenishing cathode electrolyte via an inflow stream to the cathode electrolyte; a step of e.g., removing fourth cathode electrolyte 116 via an outflow stream and replenishing the fourth electrolyte via an inflow stream of the fourth electrolyte.

Figure 3:
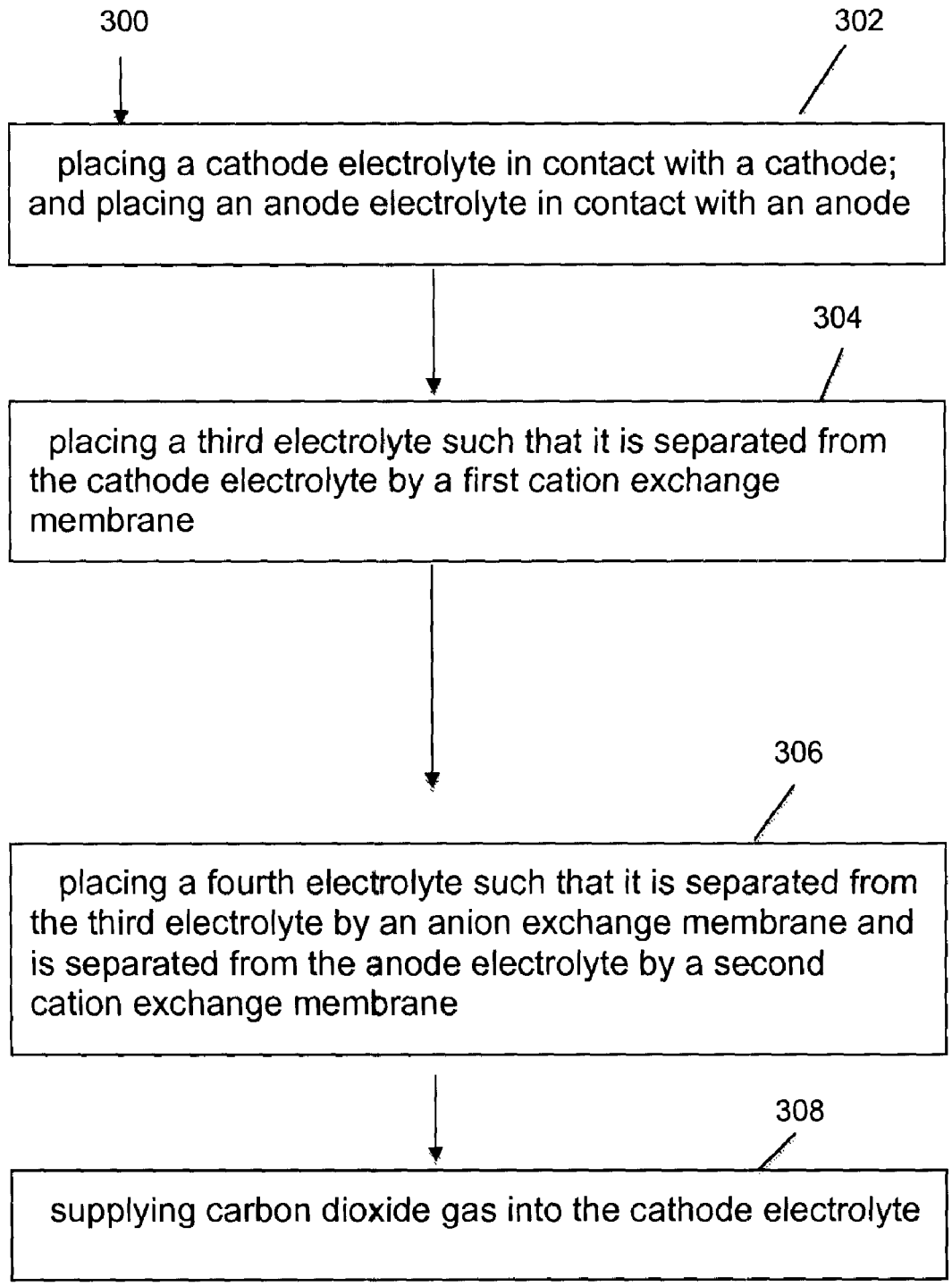
FIG. 3 is a flow chart of an embodiment of the present method.

With reference to FIGS. 3 and 1, in another embodiment, the method 300 comprises a step of 302 of e.g., placing a cathode electrolyte 102 in contact with a cathode 104, and an anode electrolyte 106 in contact with an anode 108; a step 304 of e.g., placing a third electrolyte 110 such that it is separated from the cathode electrolyte 102 by a first cation exchange membrane 112; a step 306 of e.g., placing a fourth electrolyte 116 such that it is separated from the third electrolyte 110 by an anion exchange membrane 120 and is separated from the anode electrolyte 106 by a second cation exchange membrane 118; and a step 308 of e.g., forming hydroxide ions in the cathode electrolyte 102 by applying a voltage across the anode and cathode.

In various embodiments, method 300 as with method 200 does not form a gas at the anode 108 when the voltage applied across the anode and cathode is less than 3, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 V or less, while hydrogen gas is provided to the anode where it is oxidized to protons. As will be appreciated by one ordinarily skilled in the art, by not forming a gas at the anode and by providing hydrogen gas to the anode for oxidation at the anode, hydroxide ions are produced in the cathode electrolyte with the present voltages. In various embodiments, method 300 in conjunction with the system of FIG. 1 further comprises a step of: e.g., applying a voltage across the anode 108 and cathode 104 such that a gas, e.g., oxygen or chlorine, is prevented from forming at the anode; a step of e.g., forming bicarbonate ions, carbonate ions or a mixture of bicarbonate and carbonate ions in the cathode electrolyte 102; a step of e.g., supplying and oxidizing hydrogen gas at the anode 108; applying a voltage of 3, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 V or less across the cathode and anode; e.g., forming hydrogen gas the cathode 104; a step of e.g., oxidizing hydrogen gas at the anode to form protons at the anode; a step of e.g., forming a pH differential of 1, 2, 3, 4, 5, 6, 7, 8, 9, 10, 11, 12, 13, 14 pH units or greater between the anode electrolyte and cathode electrolyte without forming a gas at the anode; a step of e.g., forming a pH gradient of pH differential of 1, 2, 3, 4, 5, 6, 7, 8, 9, 10, 11, 12, 13, 14 pH units or greater between the fourth electrolyte and cathode electrolyte without forming a gas at the anode; a step of e.g., forming sodium carbonate, sodium bicarbonate or mixture of sodium carbonate and sodium bicarbonate in the cathode electrolyte 102; a step of e.g., migrating protons from the anode electrolyte 106 across the second cation exchange membrane 118 to the fourth electrolyte 116; a step of migrating anions from the third electrolyte 110 across the anion exchange membrane to the fourth electrolyte 116; a step of e.g., migrating chloride ions from the third electrolyte 110 across the anion exchange membrane 120 to the fourth electrolyte 116; a step of e.g., forming an acid 148 in the fourth electrolyte; a step of e.g., forming hydrochloric acid 148 in the fourth electrolyte; a step of e.g., migrating cations from the third electrolyte 110 across the first cation exchange membrane 112 to the cathode electrolyte 102; a step of e.g., migrating sodium ions from the third electrolyte 110 across the first cation exchange membrane 112 to the cathode electrolyte 102; a step of e.g., circulating hydrogen gas 136 formed at the cathode 104 for oxidation at the anode 108; a step of e.g., circulating at least a portion of the cathode electrolyte 102 from an outflow to an inflow stream of the cathode electrolyte; and a step of e.g., circulating a portion of the fourth electrolyte 116 from an outflow stream to an inflow stream.

In various embodiments, bicarbonate ions and carbonate ions are produced where the voltage applied across the anode and cathode is less than 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1V or less without the formation of gas at the anode. In various embodiments, the method is adapted to withdraw and replenish at least a portion of the cathode electrolyte and the acid in the fourth electrolyte back into the system in either a batch, semi-batch or continuous mode of operation.

With reference to FIG. 1, when a voltage is applied across the anode and cathode hydroxide ions, or carbonate and/or bicarbonate ions will form in the in the cathode electrolyte and consequently cause the pH of the cathode electrolyte to be adjusted. In one embodiment, when a voltage of about 0.1 V or less, 0.2 V or less. 0.4V or less, 0.6 V or less, 0.8 V or less, 1.0V or less, 1.5V or less, or 2.0V or less, e.g., when a voltage of 0.8V or less is applied across the anode and cathode, the pH of the cathode electrolyte solution is increased; in another embodiment, when a voltage of 0.01 to 2.5 V, or 0.01V to 2.0V, or 0.1V to 2.0V, or 0.1 to 2.0 V, or 0.1V to 1.5V, or 0.1 V to 1.0V, or 0.1V to 0.8V, or 0.1V to 0.6V, or 0.1V to 0.4V, or 0.1V to 0.2V, or 0.01V to 1.5V, or 0.01 V to 1.0V, or 0.01V to 0.8V, or 0.01V to 0.6V, or 0.01V to 0.4V, or 0.01V to 0.2V, or 0.01V to 0.1V, e.g., when a voltage of 0.1V to 2.0V is applied across the anode and cathode the pH of the cathode electrolyte increased; in yet another embodiment, when a voltage of about 0.1 to 1 V is applied across the anode and cathode the pH of the cathode electrolyte solution increased. Similar results are achievable with voltages of 0.1 to 0.8 V; 0.1 to 0.7 V; 0.1 to 0.6 V; 0.1 to 0.5 V; 0.1 to 0.4 V; and 0.1 to 0.3 V across the electrodes.

Exemplary results achieved with the present system are summarized in Table 1, below. Using 270 $cm^2$ 20-mesh Ni gauze for cathode and a 50 $cm^2$ 100-mesh Pt gauze as anode, several 24-hr runs were done where hydrogen gas flow to the anode was controlled at a rate of 20 mL/min at room temperature while various voltages were applied across the anode and cathode. A Solartron™ potentiostat was used for electrochemical measurements, and a PC Acid and a PC SK ion exchange membrane from GMbH™ Membranes of Germany were chosen as the anion exchange membrane and cation exchange membrane, respectively.

embodiments the method and system are capable of producing a pH difference of more than 1.0 pH units, or 2 pH units, or 4 pH units, or 6 pH units, or 8 pH units, or 10 pH units, or 12 pH units, or 14 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.1V or less is applied across the anode and cathode. In some embodiments the invention provides a system that is capable of producing a pH difference of more than 2.0 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.2V or less is applied across the anode and cathode.

In other embodiments, the method and system are capable of producing a pH difference of more than 4.0 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.4V or less is applied across the anode and cathode. In some embodiments the invention provides a system that is capable of producing a pH difference of more than 6 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.6V or less is applied across the anode and cathode. In some embodiments the invention provides a system that is capable of producing a pH difference of more than 8 pH units between a first electrolyte solution and a second electrolyte solution where the first electrolyte solution contacts an anode and the second electrolyte solution contacts a cathode, and the two electrolyte solutions are separated, e.g., by one or more exchange membranes, when a voltage of 0.8V or less is applied across the anode and cathode. in particular embodiments the invention provides a system that is capable of producing a pH difference of more than 8 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of

TABLE 1

24-hr Analysis Summary

| Applied Voltage | Anion Exchange Membrane | Cation Exchange Membrane | Initial Anode pH | Final Anode pH | Initial Cathode pH | Final Cathode pH | Change Cathode in pH |
|---|---|---|---|---|---|---|---|
| 1.0 | PC Acid | PC SK | 5.87 | 1.13 | 9.75 | 12.44 | 2.69 |
| 1.0 | PC Acid | PC SK | 4.68 | 2.03 | 9.20 | 12.43 | 3.23 |
| 1.0 | PC Acid | PC SK | 3.25 | 2.02 | 9.98 | 11.33 | 1.35 |

For example, in particular embodiments the method and system are capable of producing a pH difference of more than 0.5 pH units between the anode electrolyte solution and a cathode electrolyte solution, and the two electrolyte solutions are separated, e.g., by one or more ion exchange membranes, when a voltage of 3V or less, 2.9 V or less or 2.5 V or less, or 2 V or less is applied across the anode and cathode. In some 1.0 V or less is applied across the anode and cathode. In some embodiments the invention provides a system that is capable of producing a pH difference of more than 10 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 1.2V or less is applied across the anode and cathode.

As will be appreciated by one skilled in the art, the voltage need not be kept constant and the voltage applied across the anode and the cathode may be very low, e.g., 0.05V or less, when the two electrolytes are the same pH or close in pH, and that the voltage may be increased as needed as the pH difference increases. In this way, the desired pH difference or production of hydroxide ions, carbonate ions and bicarbonate ions may be achieved with the minimum average voltage. Thus in some embodiments described in the previous paragraph, the average voltage may be less than 80%, 70%, 60%, or less than 50% of the voltages given in previous paragraph for particular embodiments.

In various embodiments and with reference to FIG. 1, hydrogen gas formed at the cathode 104 is directed to the anode 108. Without being bound to any theory, it is believed that the hydrogen gas is adsorbed and/or absorbed into the anode and subsequently oxidized to form protons at the anode.

In some embodiments, divalent cations are removed from the electrolyte solutions, e.g., in magnesium or calcium, during parts of the process where the electrolytes are in contact with the ion exchange membranes. This is done to prevent scaling of the membranes, if necessary for that particular membrane. Thus, in various embodiments the total concentration of divalent cations in the electrolyte solutions when they are in contact with the ion exchange membrane or membranes for any appreciable time is less than 0.06 mol/kg solution, or less than 0.06 mol/kg solution, or less than 0.04 mol/kg solution, or less than 0.02 mol/kg solution, or less than 0.01 mol/kg solution, or less than 0.005 mol/kg solution, or less than 0.001 mol/kg solution, or less than 0.0005 mol/kg solution, or less than 0.0001 mol/kg solution, or less than 0.00005 mol/kg solution.

In embodiments where carbon dioxide gas is dissolved in the cathode electrolyte, as protons are removed from the cathode electrolyte more carbon dioxide may be dissolved to form bicarbonate and/or carbonate ions. Depending on the pH of the cathode electrolyte the balance is shifted toward bicarbonate or toward carbonate, as is well understood in the art and as is illustrated in the carbonate speciation diagram, above. In these embodiments the pH of the cathode electrolyte solution may decrease, remain the same, or increase, depending on the rate of removal of protons compared to rate of introduction of carbon dioxide. It will be appreciated that no hydroxide, carbonate or bicarbonate ion are formed in these embodiments, or that hydroxide, carbonate, bicarbonate may not form during one period but form during another period.

In another embodiment, the present system and method are integrated with a carbonate and/or bicarbonate precipitation system (not illustrated) wherein a solution of divalent cations, when added to the present cathode electrolyte, causes formation of precipitates of divalent carbonate and/or bicarbonate compounds e.g., calcium carbonate or magnesium carbonate and/or their bicarbonates. In various embodiments, the precipitated divalent carbonate and/or bicarbonate compounds are utilized as building materials, e.g., cements and aggregates as described for example in commonly assigned U.S. patent application Ser. No. 12/126,776 filed on May 23, 2008, herein incorporated by reference in its entirety.

In an alternative embodiment, the present system and method are integrated with a mineral and/or material dissolution and recovery system (not illustrated) wherein the acidic fourth electrolyte solution 116 or the basic cathode electrolyte 102 is utilized to dissolve calcium and/or magnesium-rich minerals e.g., serpentine or olivine, or waste materials e.g., fly ash, red mud and the like, to form divalent cation solutions that are utilized to precipitate carbonates and/or bicarbonates as described herein. In various embodiments, the precipitated divalent carbonate and/or bicarbonate compounds are utilized as building materials, e.g., cements and aggregates as described for example in commonly assigned U.S. patent application Ser. No. 12/126,776 filed on May 23, 2008, herein incorporated by reference in its entirety.

In an alternative embodiment, the present system and method are integrated with an industrial waste gas treatment system (not illustrated) for sequestering carbon dioxide and other constituents of industrial waste gases, e.g., sulfur gases, nitrogen oxide gases, metal and particulates, wherein by contacting the flue gas with a solution comprising divalent cations and the present cathode electrolyte comprising hydroxide, bicarbonate and/or carbonate ions, divalent cation carbonates and/or bicarbonates are precipitated as described in commonly assigned U.S. patent application Ser. No. 12/344,019 filed on Dec. 24, 2008, herein incorporated by reference in its entirety. The precipitates, comprising, e.g., calcium and/or magnesium carbonates and bicarbonates in various embodiments are utilized as building materials, e.g., as cements and aggregates, as described in commonly assigned U.S. patent application Ser. No. 12/126,776 filed on May 23, 2008, herein incorporated by reference in its entirety.

In another embodiment, the present system and method are integrated with an aqueous desalination system (not illustrated) wherein the partially desalinated water 150 of the third electrolyte of the present system is used as feed-water for the desalination system, as described in commonly assigned U.S. patent application Ser. No. 12/163,205 filed on Jun. 27, 2008, herein incorporated by reference in its entirety.

In an alternative embodiment, the present system and method are integrated with a carbonate and/or bicarbonate solution disposal system (not illustrated) wherein, rather than producing precipitates by contacting a solution of divalent cations with the first electrolyte solution to form precipitates, the system produces a slurry or suspension comprising carbonates and/or bicarbonates. In various embodiments, the slurry/suspension is disposed of in a location where it is held stable for an extended periods of time, e.g., the slurry/suspension is disposed in an ocean at a depth where the temperature and pressure are sufficient to keep the slurry stable indefinitely, as described in U.S. patent application Ser. No. 12/344,019 filed on Dec. 24, 2008, herein incorporated by reference in its entirety.

While several embodiments of the system and method have been shown and described herein, it will be obvious to those skilled in the art that such embodiments are provided by way of example and not by limitation. Thus, variations, changes, and substitutions will occur to those skilled in the art that are within the scope of the appended claims.

The invention claimed is:

1. An integrated system comprising:
   an electrochemical system comprising
      a first cell containing a cathode electrolyte, the cathode electrolyte contacting a cathode and comprising a hydroxide,
      a second cell containing an anode electrolyte, the anode electrolyte contacting an anode, wherein
         the cathode is configured to produced hydroxide ions and hydrogen gas and the anode is configured to absorb hydrogen gas and produce protons without producing a gas on application of a voltage across the anode and cathode, a third cell separated from the cathode electrolyte by an ion exchange membrane and connected to a source of concentrated salt solution and configured to receive the concentrated salt solution and produce a depleted salt solution, a fourth cell separated from the second and third cells by ion exchange membranes and configured to produce a concentrated acid solution;

a system configured for absorbing a gas in the cathode electrolyte operably connected to the electrochemical system wherein the gas comprises waste gases of a cement production plant or a power generating plant; and a material dissolution system operably connected to the electrochemical system and configured to utilize the acid and/or hydroxide in the cathode electrolyte to dissolve a calcium and/or magnesium rich material and produce a divalent cation solution.

2. The integrated system of claim 1, wherein the waste gas comprises carbon dioxide.

3. The integrated system of claim 2, wherein the system for absorbing a gas in the cathode electrolyte is configured to produce a carbonate and/or a bicarbonate by mixing the cathode electrolyte, the waste gas and the divalent cation solution.

4. The integrated system of claim 3, wherein the hydroxide and/or a bicarbonate and/or carbonate comprise calcium and/or magnesium.

5. The integrated system of claim 4, wherein the
hydroxide in the cathode electrolyte is produced by migrating cations from the third electrolyte into the cathode electrolyte, and the concentrated acid in the fourth electrolyte is produced by migrating protons from the anode electrolyte and anions from the third electrolyte into the fourth electrolyte.

6. The integrated system of claim 5, wherein the calcium and/or magnesium material comprises a mineral, fly ash or red mud.

7. The integrated system of claim 6, further comprising a desalination system operatively connected to electrochemical system and configured to produce desalinated water from the salt depleted third electrolyte.

8. The integrated system of claim 7, further comprising a slurry disposal system operatively connected to the carbonate precipitating system and configured to receive and dispose the precipitated calcium and/or magnesium carbonate and/or bicarbonate in an ocean at a depth where the temperature and pressure are sufficient to keep the slurry stable indefinitely.

9. A method comprising:
receiving a concentrated salt solution and producing a depleted salt solution in a third cell of an electrochemical system by applying a voltage across a cathode contained in a first cell and an anode contained in a second cell of the electrochemical system, receiving a weak acid solution and producing a concentrated acid solution in a fourth cell of the electrochemical system wherein the third cell is separated from the first cell containing a cathode electrolyte, the cathode electrolyte comprising a hydroxide and contacting the cathode, and the fourth cell is separated from the second cell containing an anode electrolyte, the anode electrolyte contacting the anode, producing hydroxide ions and hydrogen gas at the cathode, and absorbing hydrogen gas and producing protons at the anode without producing a gas at the anode;

absorbing a gas in the cathode electrolyte wherein the gas comprises waste gases of a cement production plant or a power generating plant; and dissolving a solid material comprising a calcium and/or magnesium rich material with the acid to produce a divalent cation solution.

10. The method of claim 9, comprising producing a hydroxide and/or a bicarbonate and/or a carbonate with the cathode electrolyte and the divalent cation solution.

11. The method of claim 10, wherein the hydroxide and/or a bicarbonate and/or a carbonate comprises calcium and/or magnesium.

12. The method of claim 11, comprising dissolving a waste material comprising a mineral, fly ash or red mud with the acid to produce the divalent cation solution.

13. The method of claim 12, comprising producing desalinated water from the third electrolyte in a desalination system.

14. The method of claim 13, comprising disposing the cathode electrolyte comprising precipitated calcium and/or magnesium carbonate and/or bicarbonate at an ocean depth where the temperature and pressure are sufficient to keep the slurry stable indefinitely.

* * * * *

UNITED STATES PATENT AND TRADEMARK OFFICE
Certificate

Patent No. 7,875,163 B2                                                            Patented: January 25, 2011

ON petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ryan J. Gilliam, San Jose, CA (US); Thomas A. Albrecht, Mountain View, CA (US); Nikhil Jalani, Campbell, CA (US); Nigel Antony Knott, Campbell, CA (US); Valentin Decker, San Jose, CA (US); Michael Kostowkyj, Los Gatos CA (US); Bryan Boggs, Campbell, CA (US); Kasra Farsad, San Jose, CA (US); and Alexander Gorer, Los Gatos, CA (US).

Signed and Sealed this Twelfth Day of July 2011.

*KEITH D. KENDRICKS*
*Supervisory Patent Examiner*
Art Unit 1724
Tecnology Center 1700

UNITED STATES PATENT AND TRADEMARK OFFICE
Certificate

Patent No. 7,875,163 B2

Patented: January 25, 2011

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: Ryan J. Gilliam, San Jose, CA (US); Thomas A. Albrecht, Mountain View, CA (US); Nikhil Jalani, Campbell, CA (US); Nigel Antony Knott, Campbell, CA (US); Valentin Decker, San Jose, CA (US); Michael Kostowkyj, Los Gatos, CA (US); Bryan Boggs, Campbell, CA (US); Kasra Farsad, San Jose, CA (US); and Alexander Gorer, Los Gatos, CA (US).

Signed and Sealed this Ninth Day of August 2011.

KEITH D. HENDRICKS
*Supervisory Patent Examiner*
Art Unit 1724
Technology Center 1700